United States Patent
Lee et al.

(10) Patent No.: US 12,526,750 B2
(45) Date of Patent: Jan. 13, 2026

(54) METHOD FOR TRANSMITTING/RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Jeongsu Lee, Seoul (KR); Hyunsu Cha, Seoul (KR); Kijun Kim, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 476 days.

(21) Appl. No.: 17/924,501

(22) PCT Filed: May 17, 2021

(86) PCT No.: PCT/KR2021/006147
§ 371 (c)(1),
(2) Date: Nov. 10, 2022

(87) PCT Pub. No.: WO2021/230731
PCT Pub. Date: Nov. 18, 2021

(65) Prior Publication Data
US 2023/0345380 A1      Oct. 26, 2023

(30) Foreign Application Priority Data

| May 15, 2020 | (KR) | .................. | 10-2020-0058046 |
| May 15, 2020 | (KR) | .................. | 10-2020-0058100 |

(51) Int. Cl.
*H04W 52/24* (2009.01)
*H04B 17/318* (2015.01)
*H04W 52/14* (2009.01)

(52) U.S. Cl.
CPC ........ *H04W 52/242* (2013.01); *H04B 17/318* (2015.01); *H04W 52/146* (2013.01)

(58) Field of Classification Search
CPC ............ H04W 52/242; H04W 52/146; H04W 62/325; H04W 64/00; H04W 72/04;
(Continued)

(56) References Cited

U.S. PATENT DOCUMENTS

| 11,689,969 B2 * | 6/2023 | Zhang ............... H04W 36/0016 |
| | | 370/254 |
| 2019/0268971 A1 | 8/2019 | Talarico et al. |

(Continued)

FOREIGN PATENT DOCUMENTS

| KR | 10-2019-0116927 A | 10/2019 |
| KR | 10-2019-0126834 A | 11/2019 |
| WO | 2018128409 A1 | 7/2018 |

*Primary Examiner* — John J Lee
(74) *Attorney, Agent, or Firm* — BRYAN CAVE LEIGHTON PAISNER LLP

(57) ABSTRACT

Various embodiments relate to a next-generation wireless communication system for supporting a data transmission rate higher than that of a 4th generation (4G) wireless communication system. According to various embodiments, provided are a method for transmitting/receiving a signal in a wireless communication system, and an apparatus for supporting same. Various other embodiments may be provided.

11 Claims, 26 Drawing Sheets

(58) Field of Classification Search
CPC ....... H04B 17/318; H04B 7/06; H04L 5/0048; H04L 1/08; H04L 5/00
See application file for complete search history.

(56) References Cited

U.S. PATENT DOCUMENTS

2020/0084682 A1\* 3/2020 Wang .............. H04W 36/00835
2023/0328597 A1\* 10/2023 Xiong ............... H04W 36/0058
370/331

\* cited by examiner (a)

(b)

METHOD FOR TRANSMITTING/RECEIVING SIGNAL IN WIRELESS COMMUNICATION SYSTEM, AND APPARATUS FOR SUPPORTING SAME

CROSS-REFERENCE TO RELATED APPLICATIONS

This application is a National Stage Filing Under 35 U.S.C. 371 of International Application No. PCT/KR2021/006147, filed on May 17, 2021, which claims the benefit of earlier filing date and right of priority to Korean Application No. 10-2020-0058046, filed on May 15, 2020, Korean Application No. 10-2020-0058100, filed on May 15, 2020, the contents of which are all hereby incorporated by reference herein in their entirety.

TECHNICAL FIELD

Various embodiments relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

Various embodiments may provide a method of transmitting and receiving a signal in a wireless communication system and apparatus for supporting the same.

When a cell to be referenced by a user equipment (UE) to configure a beam for transmitting a sounding reference signal (SRS) is different from a cell to be referenced to measure transmission power, the UE may experience power loss or fail to configure a correct beam direction. According to various embodiments, an SRS configuration may be provided to solve this issue.

According to various embodiments, there may be provided a method of transmitting a signal on supplementary uplink (SUL) and a power control method when a base station/server additionally provides resource allocation information on the SUL to a UE in addition to that on non-SUL.

It will be appreciated by persons skilled in the art that the objects that could be achieved with the various embodiments are not limited to what has been particularly described hereinabove and the above and other objects that the various embodiments could achieve will be more clearly understood from the following detailed description.

Various embodiments may provide a device operating in a wireless communication system and an operation method therefor.

According to various embodiments, the method may include: receiving first configuration information including resource allocation information on a supplementary uplink (SUL); receiving second configuration information including resource allocation information on a non-SUL; and transmitting a positioning sounding reference signal (SRS) on the SUL based on that any one of predefined conditions is satisfied.

According to various embodiments, based on none of the predefined conditions are satisfied, the positioning SRS may be transmitted on the non-SUL.

According to various embodiments, the predefined conditions may include reception of indication information indicating that the positioning SRS is transmitted on the SUL.

According to various embodiments, the method may further include: receiving a downlink reference signal (DL RS); and detecting strength of the RS.

According to various embodiments, the predefined conditions may include that the strength of the DL RS is less than a predefined threshold, and the RS may include at least one of a synchronization signal block (SSB), a channel state information reference signal (CSI-RS), or a positioning reference signal (PRS).

According to various embodiments, the method may further include receiving information on a number of repeated transmissions and a transmission periodicity related to the positioning SRS.

According to various embodiments, the first configuration information and the second configuration information may include information on frequency hopping for the positioning SRS.

According to various embodiments, the method may further include receiving information for configuring a compensation value that compensates for power for SUL switching, According to various embodiments, transmission power of the positioning SRS transmitted on the SUL may be determined based on: (i) a path loss value based on a DL RS measured on the non-SUL; and (ii) the compensation value.

According to various embodiments, there is provided a UE configured to operate in a wireless communication system. The UE may include: a transceiver; and at least one processor connected to the transceiver.

According to various embodiments, the at least one processor may be configured to: receive first configuration information including resource allocation information on an SUL; receive second configuration information including resource allocation information on a non-SUL; and transmit a positioning SRS on the SUL based on that any one of predefined conditions is satisfied.

According to various embodiments, the at least one processor may be configured to communicate with at least one of a mobile UE, a network, or an autonomous vehicle other than a vehicle including the UE.

According to various embodiments, there is provided a method performed by a base station in a wireless communication system. The method may include: transmitting first configuration information comprising resource allocation information on an SUL; transmitting second configuration information comprising resource allocation information on a non-SUL; and receiving a positioning SRS on the SUL based on that any one of predefined conditions is satisfied.

According to various embodiments, there is provided a base station configured to operate in a wireless communication system. The base station may include: a transceiver; and at least one processor connected to the transceiver. The at least one processor may be configured to: transmit first configuration information comprising resource allocation information on a SUL; transmit second configuration information comprising resource allocation information on a non-SUL; and receive a positioning SRS on the SUL based on that any one of predefined conditions is satisfied.

According to various embodiments, there is provided an apparatus configured to operate in a wireless communication system. The apparatus may include: at least one processor; and at least one memory operably coupled to the at least one processor and configured to store one or more instructions that, based on execution, cause the at least one processor to perform operations.

According to various embodiments, the operations may include: receiving first configuration information comprising resource allocation information on an SUL; receiving second configuration information comprising resource allocation information on a non-SUL; and transmitting a positioning SRS on the SUL based on that any one of predefined conditions is satisfied.

According to various embodiments, there is provided a non-transitory processor-readable medium configured to store one or more instructions that cause at least one processor to perform operations. the operations may include: receiving first configuration information comprising resource allocation information on an SUL; receiving second configuration information comprising resource allocation information on a non-SUL; and transmitting a positioning SRS on the SUL based on that any one of predefined conditions is satisfied.

It will be understood by those skilled in the art that the above-described embodiments are parts of various embodiments, and various modifications and alternatives that reflect the technical features of the embodiments could be developed from the following technical features of the present disclosure.

According to various embodiments, a signal may be effectively transmitted and received in a wireless communication system.

According to various embodiments, positioning may be effectively performed in a wireless communication system.

According to various embodiments, positioning measurement may be effectively performed based on supplementary uplink (SUL).

According to various embodiments, it is possible to solve a problem that a user equipment (UE) may experience power loss or fail to configure a correct beam direction.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

BEST MODE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
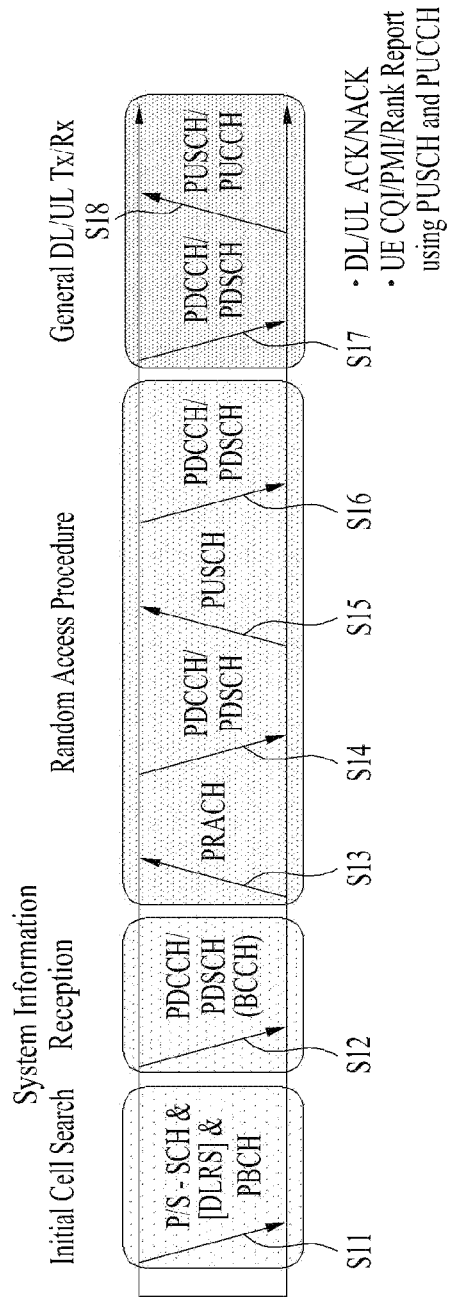
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information).

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
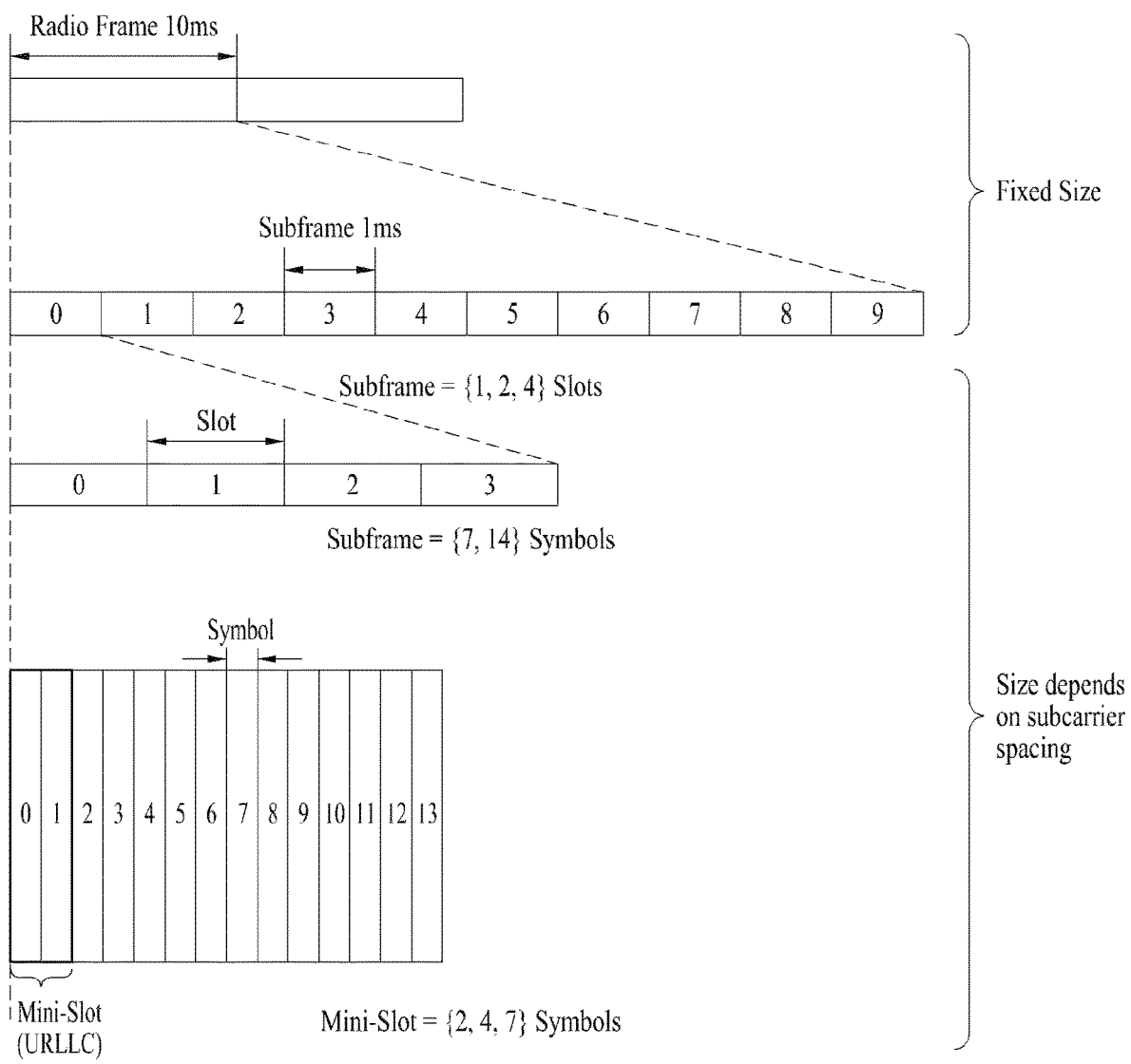
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or p). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), p and a CP are obtained from RRC parameters provided by the BS.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology p, slots are numbered with $n^\mu_s \in \{0, \ldots, N^{slot,\mu}_{subframe}-1\}$. in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 3-continued

| μ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
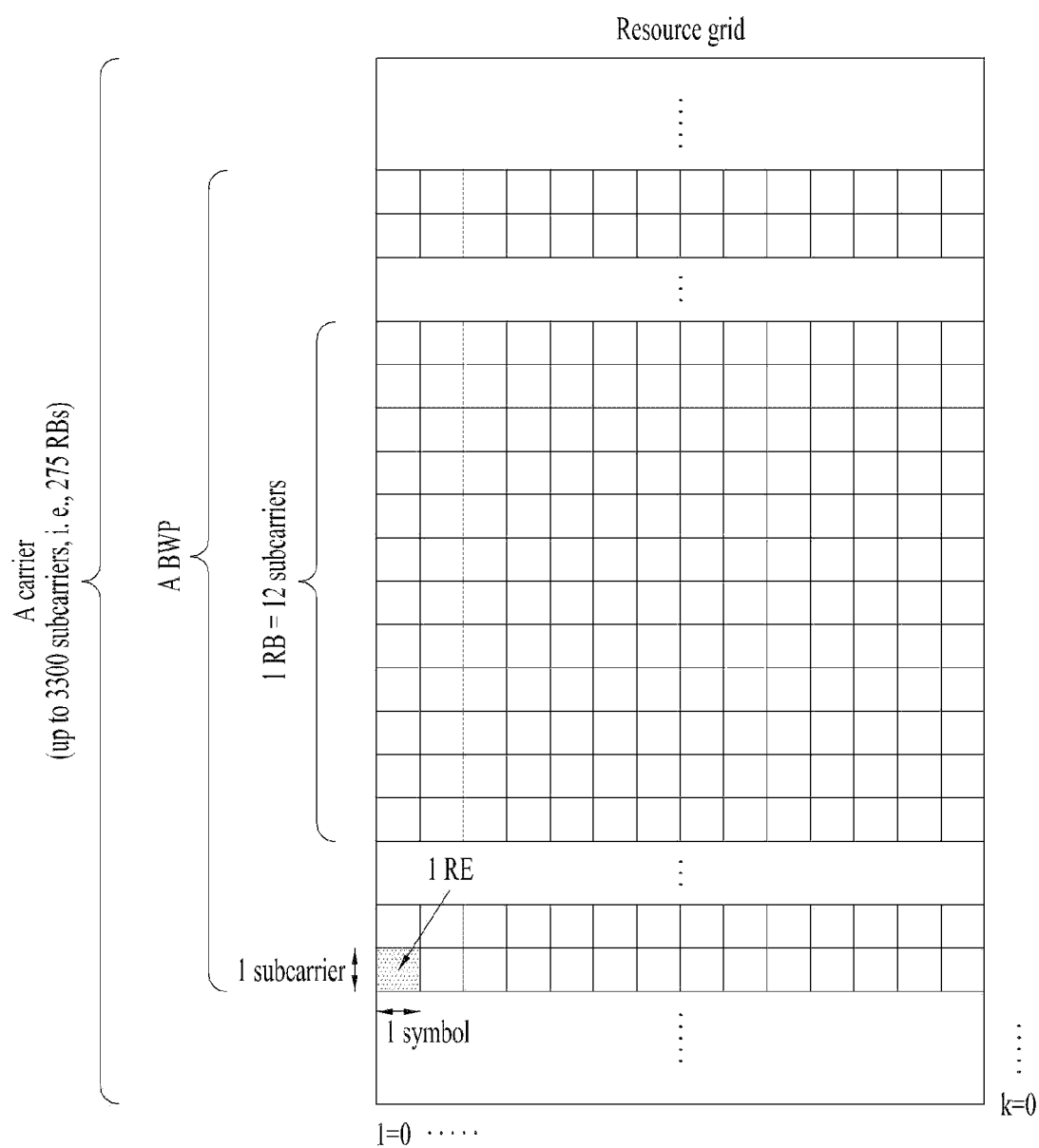
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^\mu$ OFDM symbols by $N^{size,\mu}_{grid} \times N^{RB}_{SC}$ subcarriers, where $N^{size,\mu}_{grid}$ is indicated by RRC signaling from the BS. $N^{size,\mu}_{grid}$ grid may vary according to an SCS configuration μ and a transmission direction, UL or DL. There is one resource grid for an SCS configuration p, an antenna port p, and a transmission direction (UL or DL). Each element of the resource grid for the SCS configuration μ and the antenna port p is referred to as an RE and uniquely identified by an index pair (k, 1) where k represents an index in the frequency domain, and 1 represents a symbol position in the frequency domain relative to a reference point. The RE (k, 1) for the SCS configuration μ and the antenna port p corresponds to a physical resource and a complex value $\alpha_{k,1}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
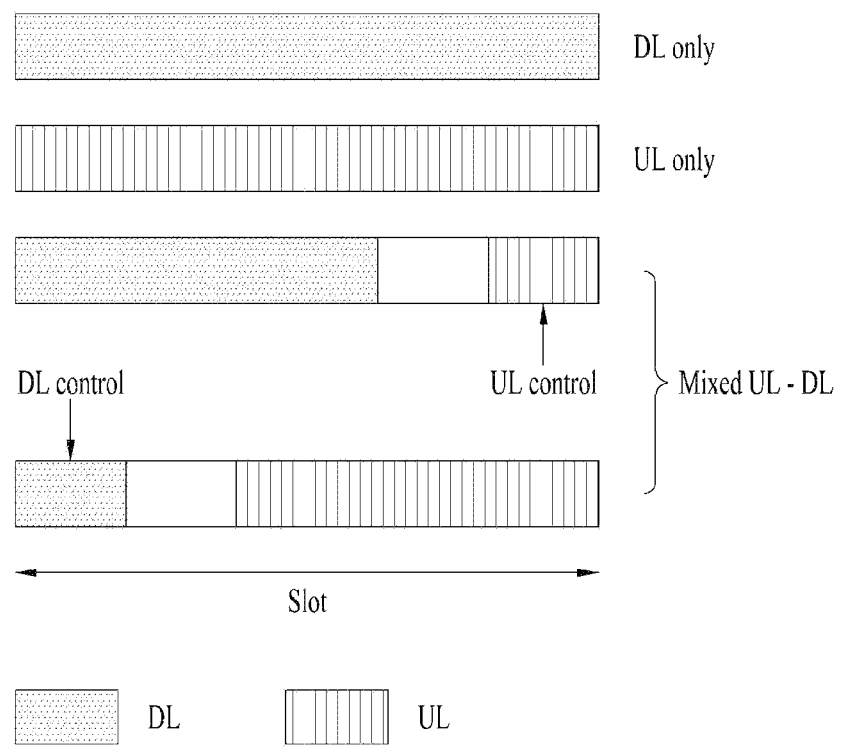
FIG. 4 is a diagram illustrating a self-contained slot structure to which various embodiments are applicable.

FIG. 4 is a diagram illustrating a self-contained slot structure to which various embodiments are applicable.

The self-contained slot structure may refer to a slot structure in which all of a DL control channel, DL/UL data, and a UL control channel are included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of final data transmission.

In this self-contained slot structure, a time gap of a predetermined time length may be required to allow the BS and UE to switch from transmission mode to reception mode and vice versa. To this end, some OFDM symbols at the time of switching from DL to UL may be set to a guard period (GP) in the self-contained slot structure.

Although it has been described above that the self-contained slot structure includes both DL and UL control regions, these control regions may be selectively included in the self-contained slot structure. In other words, the self-contained slot structure according to various embodiments may include either the DL control region or UL control region as well as both the DL and UL control regions as illustrated in FIG. 4.

In addition, the order of regions in one slot may vary depending on embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structure 1.3.1 Downlink Channel Structure

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration may be associated with one or more search space sets, and each search space set may be associated with one CORESET configuration. One search space set may be determined based on the following parameters.

1.3.2. Uplink Channel Structure

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner 1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH.

1.3. Carrier Aggregation (CA)

Figure 5:
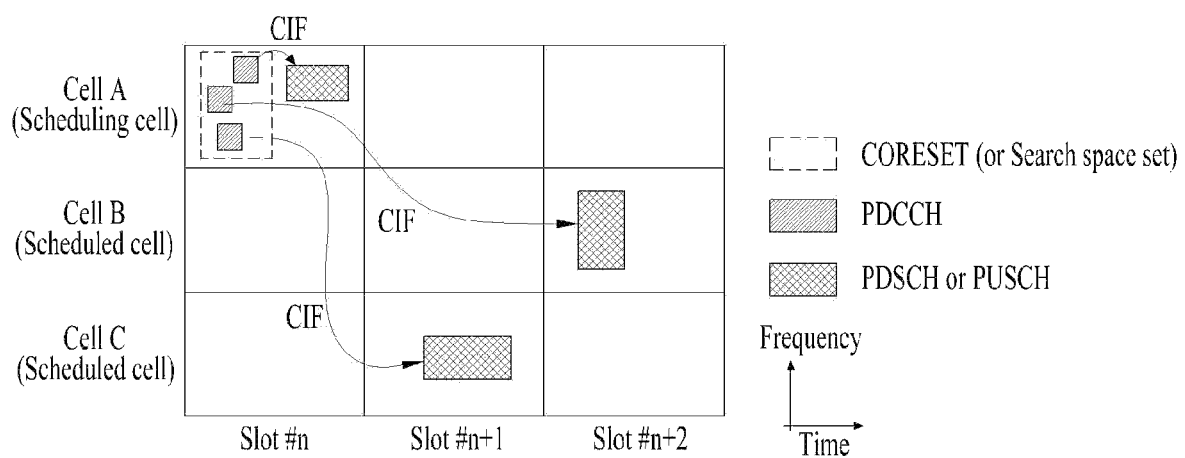
FIG. 5 is a diagram illustrating an example of a scheduling method in the case of carrier aggregation to which various embodiments are applicable.

FIG. 5 is a diagram showing an example of a scheduling method in the case of a carrier aggregation to which various embodiments are applicable. FIG. 5 shows an example of scheduling when multi-cells are aggregated.

Referring to FIG. 5, three cells may be assumed to be aggregated. When a CIF is disabled, each cell may transmit only a PDCCH in which a PDSCH/PUSCH of the cell is scheduled (self-carrier scheduling, SCS). In contrast, when a CIF is enabled via UE-specific (or UE-group-specific or cell-specific) higher layer signaling and cell A is configured as a scheduling cell, the cell A may transmit a PDCCH for scheduling a PDSCH/PUSCH of another cell (i.e., a scheduled cell) as well as a PDCCH for scheduling a PDSCH/PUSCH of the cell A (cross-carrier scheduling, CCS). In this case, a cell B/C may not transmit a PDCCH for scheduling of a cell of the cell B/C.

The following terms may be used in the description of various embodiments.

Primary Cell (PCell): A cell operating at a primary frequency (e.g., Primary Component Carrier (PCC)) at which a UE performs an initial connection establishment procedure or initiates a connection re-establishment procedure when the UE is configured with carrier aggregation. A Master Cell Group (MCG) cell operating at a primary frequency at which a UE performs an initial connection establishment procedure or initiates a connection re-establishment procedure in the case of Dual connectivity (DC).

Secondary Cell (SCell): A cell that additionally provides a radio resource other than SpCell in the case of a UE configured with carrier aggregation.

Primary SCG Cell/Primary Second Cell (PSCell): A Secondary Cell Group (SCG) cell in which a UE performs random access when RRC reconfiguration and synchronization are performed in the case of DC.

Special Cell (SpCell): In the case of DC, the SpCell is a PCell of MCG or a PSCell of SCG. Otherwise (i.e., non-DC), the SpCell is a PCell.

Serving cell (ServCell): This is a cell configured in a UE in an RRC_CONNECTED state. When CA/DC is not configured, only one serving cell (i.e., PCell) is present. When CA/DC is configured, the serving cell is a cell set including SpCell (s) and all SCells.

1.4. Beam Management (BM)

BM is a series of processes for acquiring and maintaining a set of BS (or transmission and reception point (TRP)) beams and/or UE beams available for DL and UL transmissions/receptions. BM may include the following processes and terminology.

The BM refers to a series of processes for acquiring and maintaining a set of BS beams (TRP beams) and/or a set of UE beams available for DL and UL transmission/reception. The BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

UL BM Process

In UL BM, reciprocity (or beam correspondence) between a Tx beam and an Rx beam may or may not be established depending on UE implementation. When the Tx beam-Rx beam reciprocity is established for both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

The UL BM process may be divided into a UE's Tx beam sweeping and a BS's Rx beam sweeping.

Figure 6:
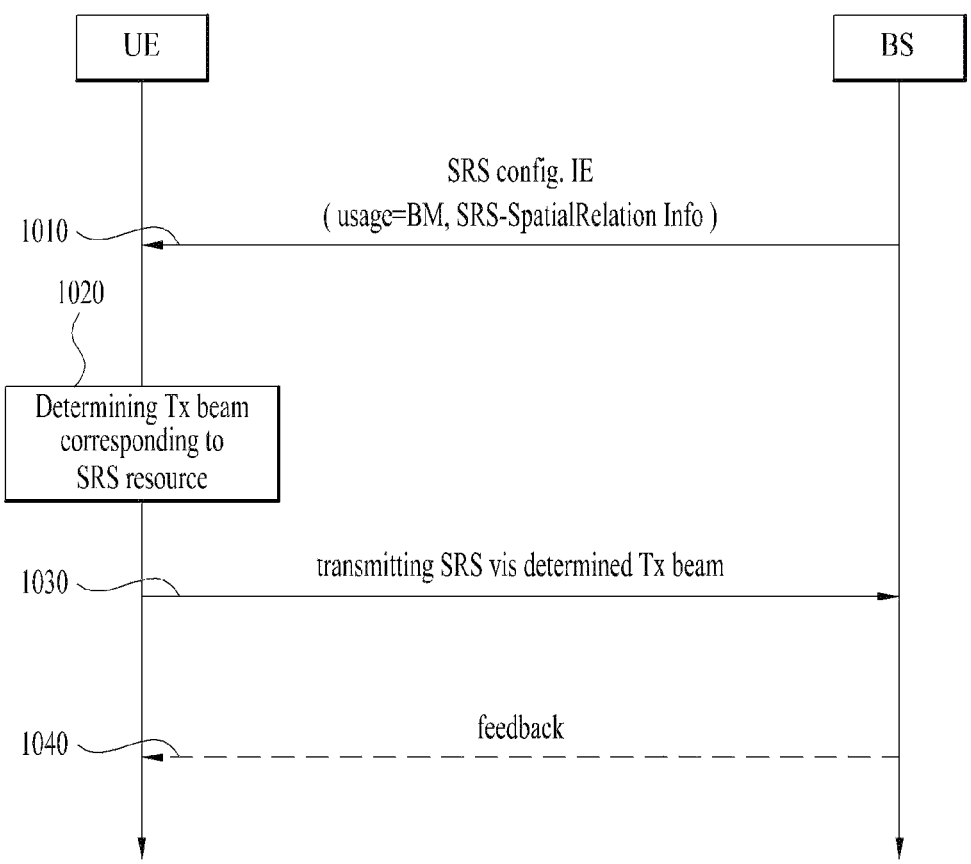
FIG. 6 is a diagram illustrating a signal flow for an exemplary UL BM process using an SRS, which is applicable to various embodiments.

FIG. 6 is a diagram illustrating a signal flow for an exemplary UL BM process using an SRS, which is applicable to various embodiments.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationlnfo is configured for an SRS resource, the same beamforming as used for the SSB, the CSI-RS, or the SRS is applied for transmission. However, if SRS-SpatialRelationlnfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationlnfo is set to 'SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationlnfo is set to 'CSI-RS,' the UE transmits the SRS by applying the same spatial domain transmission filter used for reception of the CSI-RS; or iii) if SRS-SpatialRelationlnfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

1.6. Uplink Power Control

In wireless communication systems, it may be necessary to increase or decrease the transmission power of a UE and/or a mobile device depending on situations. Controlling the transmission power of the UE and/or mobile device may be referred to as UL power control. For example, transmission power control may be applied to satisfy requirements (e.g., signal-to-noise ratio (SNR), bit error ratio (BER), block error ratio (BLER), etc.) of a BS (e.g., gNB, eNB, etc.).

The above-described power control may be performed according to an open-loop power control method and a closed-loop power control method.

Specifically, the open-loop power control method refers to a method of controlling transmission power without feedback from a transmitting device (e.g., BS, etc.) to a receiving device (e.g., UE, etc.) and/or feedback from the receiving device to the transmitting device. For example, the UE may receive a specific channel/signal (pilot channel/signal) from the BS and estimate the strength of received power based on the received channel/signal. Then, the UE may control the transmission power based on the strength of the estimated received power.

On the other hand, the closed-loop power control method refers to a method of controlling transmission power based on feedback from a transmitting device to a receiving device and/or feedback from the receiving device to the transmitting device. For example, the BS receives a specific channel/signal from the UE and determines an optimal power level of the UE based on a power level, SNR, BER, BLER, etc. which are measured based on the received specific channel/signal. The BS may transmit information (i.e., feedback) on the determined optimal power level to the UE on a control channel, and the UE may control the transmission power based on the feedback provided by the BS.

Hereinafter, power control methods for cases in which a UE and/or a mobile device perform UL transmission to a BS in a wireless communication system will be described in detail. Specifically, power control methods for transmission of a sounding reference signal (SRS) will be described. In this case, a transmission occasion (i.e., transmission time unit) (i) for the SRS may be defined by a slot index (n_s) in a frame of a system frame number (SFN), a first symbol (S) in a slot, the number of consecutive symbols (L), and so on.

Power Control of SRS

For SRS transmission in an active UL BWP of a carrier (f) of a serving cell (c), the UE may calculate a linear power value of transmission power according to Equation A. Thereafter, the UE may control the transmission power by equally dividing the calculated linear power value over antenna port(s) configured for the SRS.

Specifically, when the UE performs SRS transmission in an active UL BWP (b) of the carrier (f) of the serving cell (c) using an SRS power control adjustment state based on index 1, the UE may determine SRS transmission power $P_{SRS,b,f,c}(i,qs,l)$ (dBm) on an SRS transmission occasion (i) based on Equation 7.

[Equation 1]

$$P_{SRS,b,f,c}(i, q_s) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) \end{array} \right\}$$

In Equation 7, q_s denotes the index of an open-loop power control parameter (e.g., P_o, alpha (α), a DL RS resource for a path loss (PL) measurement (e.g., $PL_{b,f,c}(q_d)$), etc.), which may be configured for SRS resource set. Index 1 denotes the index of a closed-loop power control process, and the corresponding index may be configured independently of a PUSCH or configured in relation to the PUSCH. If SRS power control is not related to the PUSCH, the maximum number of closed-loop power control processes for the SRS may be 1.

In addition, P_o (e.g., $P_{o\_SRS,b,f,c}(q_s)$) is a parameter broadcast as part of system information and may denote target received power of the receiver. The corresponding P_o value may be configured in consideration of UE throughput, cell capacity, noise and/or interference, etc. Alpha (e.g., $\alpha_{SRS,c}(q_s)$) may denote a rate for compensating for PL. Alpha may have a value from 0 to 1, and full pathloss compensation or fractional pathloss compensation may be performed according to the configured value. In this case, the alpha value may be configured in consideration of interference between UEs and/or data rates. In addition, $P_{CMAX,f,c}(i)$ may denote configured UE transmission power. For example, the configured UE transmission power may be interpreted as 'configured maximum UE output power' defined in 3GPP TS 38.101-1 and/or TS 38.101-2. $M_{SRS,f,c}(l)$ may denote an SRS resource allocation bandwidth, which is expressed by the number of RBs in the SRS transmission occasion based on an SCS (μ). In addition, $h_{b,f,c}(i,l)$, which is related to SRS power control adjustment states, may be configured or indicated based on a TPC command field of DCI received or detected by the UE (e.g., DCI format 2_3, etc.) and/or an RRC parameter (e.g., srs-PowerControlAdjustmentStates, etc.).

A resource for SRS transmission may be applied as a reference for the BS and/or UE to determine a beam, a panel, and/or a spatial domain transmission filter. Thus, SRS transmission power control may be performed in units of beams, panels, and/or spatial domain transmission filters.

The above-described parameters and/or information for SRS power control may be configured separately (independently) for each BWP. In this case, the corresponding parameters and/or information may be configured or indicated by higher layer signaling (e.g., RRC signaling, MAC-CE, etc.) and/or DCI. For example, the parameters and/or information for SRS power control may be provided by RRC signaling such as SRS-Config, SRS-TPC-Command-Config, etc. Table 9 below shows the configurations of SRS-Config and SRS-TPC-CommandConfig. The definition and details of each parameter may be found in 3GPP TS Rel.16 38.331.

TABLE 5

| | | |
|---|---|---|
| SRS-Config ::= | SEQUENCE { | |
| srs-ResourceSetToReleaseList | SEQUENCE | |
| (SIZE(1..maxNrofSRS-ResourceSets)) OF SRS-ResourceSetId | | OPTIONAL, - - Need N |
| srs-ResourceSetToAddModList | SEQUENCE | |
| (SIZE(1..maxNrofSRS-ResourceSets)) OF SRS-ResourceSet | | OPTIONAL, - - Need N |
| srs-ResourceToRelease List | SEQUENCE | |
| (SIZE(1..maxNrofSRS-Resources)) OF SRS-ResourceId | | OPTIONAL, -- Need N |
| srs-ResourceToAddModList | SEQUENCE | |
| (SIZE(1..maxNrofSRS-Resources)) OF SRS-Resource | | OPTIONAL, -- Need N |
| tpc-Accumulation | ENUMERATED {disabled} | |
| OPTIONAL, -- Need S | | |
| ..., | | |
| SRS-ResourceSet ::= | SEQUENCE { | |
| srs-ResourceSetId | SRS-ResourceSetId, | |
| srs-ResourceIdList | SEQUENCE | |
| (SIZE(1..maxNrofSRS-ResourcesPerSet)) OF SRS-ResourceId | | OPTIONAL, -- Cond Setup |
| resourceType | CHOICE { | |
| aperiodic | SEQUENCE { | |
| aperiodicSRS-ResourceTrigger | INTEGER (1..maxNrofSRS- | |
| TriggerStates-1), | | |
| csi-RS | NZP-CSI-RS-ResourceId | |
| OPTIONAL, -- Cond NonCodebook | | |
| slotOffset | INTEGER (1..32) | |
| OPTIONAL, -- Need S | | |
| ..., | | |
| [[ | | |
| aperiodicSRS-ResourceTriggerList | SEQUENCE | |
| (SIZE(1..maxNrofSRS-TriggerStates-2)) | | |
| OF INTEGER (1..maxNrofSRS-TriggerStates-1) | OPTIONAL | -- Need M |
| ]] | | |
| }, | | |
| semi-persistent | SEQUENCE { | |
| associatedCSI-RS | NZP-CSI-RS-ResourceId | |
| OPTIONAL, -- Cond NonCodebook | | |
| ..., | | |
| }, | | |
| periodic | SEQUENCE { | |
| associatedCSI-RS | NZP-CSI-RS-ResourceId | |
| OPTIONAL, -- Cond NonCodebook | | |
| ..., | | |
| } | | |
| }, | | |
| usage | ENUMERATED | |

TABLE 5-continued

```
{beamManagement, codebook, nonCodebook, antennaSwitching},
  alpha                                  Alpha
OPTIONAL, -- Need S
  p0                                     INTEGER (-202..24)
OPTIONAL, -- Cond Setup
  pathlossReferenceRS                    PathlossReferenceRS-Config
OPTIONAL, -- Need M
  srs-PowerControlAdjustmentStates       ENUMERATED { sameAsFci2,
separateClosedLoop}         OPTIONAL, --Need S
  ...,
  [[
  pathlossReferenceRS-List-r16           SEQUENCE
(SIZE(1..maxNrofSRS-PathlossReferenceRS-r16-1)) OF PathlossReferenceRS-
Config
  OPTIONAL -- Need M
  ]]
}
PathlossReferenceRS-Config ::=           CHOICE {
  ssb-Index                              SSB-Index,
  csi-RS-Index                           NZP-CSI-RS-ResourceId
}
SRS-PosResourceSet-r16 ::=               SEQUENCE {
  srs-PosResourceSetId-r16               SRS-PosResourceSetId-
r16,
  srs-PosResourceIdList-r16              SEQUENCE
(SIZE(1..maxNrofSRS-ResourcesPerSet)) OF SRS-PosResourceId-r16
  OPTIONAL, -- Cond Setup
  resourceType-r16                       CHOICE {
  aperiodic-r16                          SEQUENCE {
  aperiodicSRS-ResourceTriggerList-r16   SEQUENCE
(SIZE(1..maxNrofSRS-TriggerStates-1))
  OF INTEGER (1..maxNrofSRS-TriggerStates-1)   OPTIONAL, -- Need M
  slotOffset-r16                         INTEGER (1..32)
OPTIONAL, -- Need S
  ...
  },
  semi-persistent-r16                    SEQUENCE {
  ...
  },
  periodic-r16                           SEQUENCE {
  ...
  }
  },
  alpha-r16                              Alpha
OPTIONAL, -- Need S
  p0-r16                                 INTEGER (-202..24)
OPTIONAL, -- Cond Setup
  pathlossReferenceRS-Pos-r16            CHOICE {
  ssb-Index-16                           SSB-Index,
  csi-RS-Index-r16                       NZP-CSI-RS-ResourceId,
  ssb-r16                                SSB-InfoNcell-r16,
  dl-PRS-r16                             DL-PRS-Info-r16
  }
OPTIONAL, -- Need M
  ...
}
  SRS-TPC-CommandConfig ::=              SEQUENCE {
  startingBitOfFormat2-3                 INTEGER (1..31)
OPTIONAL, -- Need R
  fieldTypeFormat2-3                     INTEGER (0..1)
OPTIONAL, -- Need R
  ...,
  [[
  startingBitOfFormat2-3SUL    INTEGER (1..31)
OPTIONAL -- Need R
  ]]
}
```

The UE may determine or calculate the SRS transmission power according to the above-described method and transmit the SRS based on the determined or calculated SRS transmission power.

Figure 7:
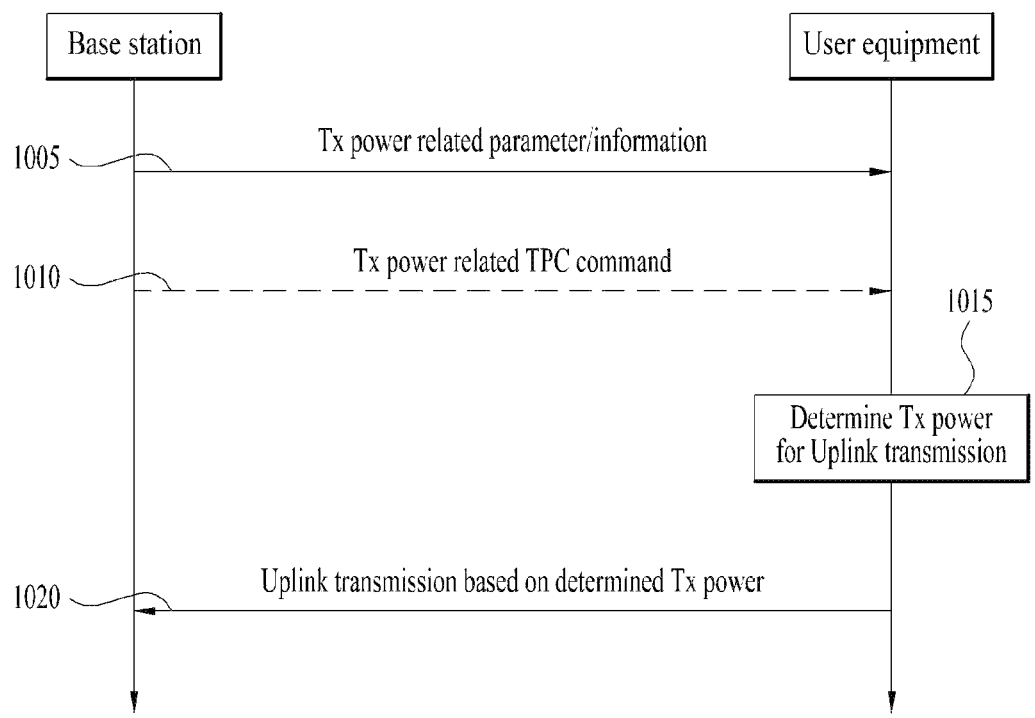
FIG. 7 is a diagram illustrating an exemplary procedure for controlling UL transmission power to which various embodiments are applicable.

FIG. 7 is a diagram illustrating an exemplary procedure for controlling UL transmission power to which various embodiments are applicable.

First, a UE may receive parameters and/or information related to transmission power (Tx power) from a BS (1005).

In this case, the UE may receive the corresponding parameters and/or information through higher layer signaling (e.g., RRC signaling, MAC-CE, etc.). For example, for PUSCH transmission, PUCCH transmission, SRS transmission, and/or PRACH transmission, the UE may receive the above-described parameters and/or information related to transmission power control.

The UE may receive a TPC command related to transmission power from the BS (1010). In this case, the UE may receive the corresponding TPC command through lower layer signaling (e.g., DCI). For example, for PUSCH transmission, PUCCH transmission, and/or SRS transmission, the UE may receive information on a TPC command to be used for determining a power control adjustment state, etc. in a TPC command field of a predefined DCI format as described above. However, the corresponding step may be omitted in PRACH transmission.

The UE may determine (or calculate) transmission power for UL transmission based on the parameters, information, and/or TPC command received from the BS (1015). For example, the UE may determine PUSCH transmission power, PUCCH transmission power, SRS transmission power, and/or PRACH transmission power according to the above-described methods (e.g., Equations 1 to 4, etc.). Additionally/alternatively, when two or more UL channels and/or signals need to be transmitted together as in carrier aggregation, the UE may determine the transmission power for UL transmission in consideration of the above-described priorities.

The UE may perform transmission of one or more UL channels and/or signals (e.g., PUSCH, PUCCH, SRS, PRACH, etc.) to the BS based on the determined (or calculated) transmission power (1020).

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol configuration

Figure 8:
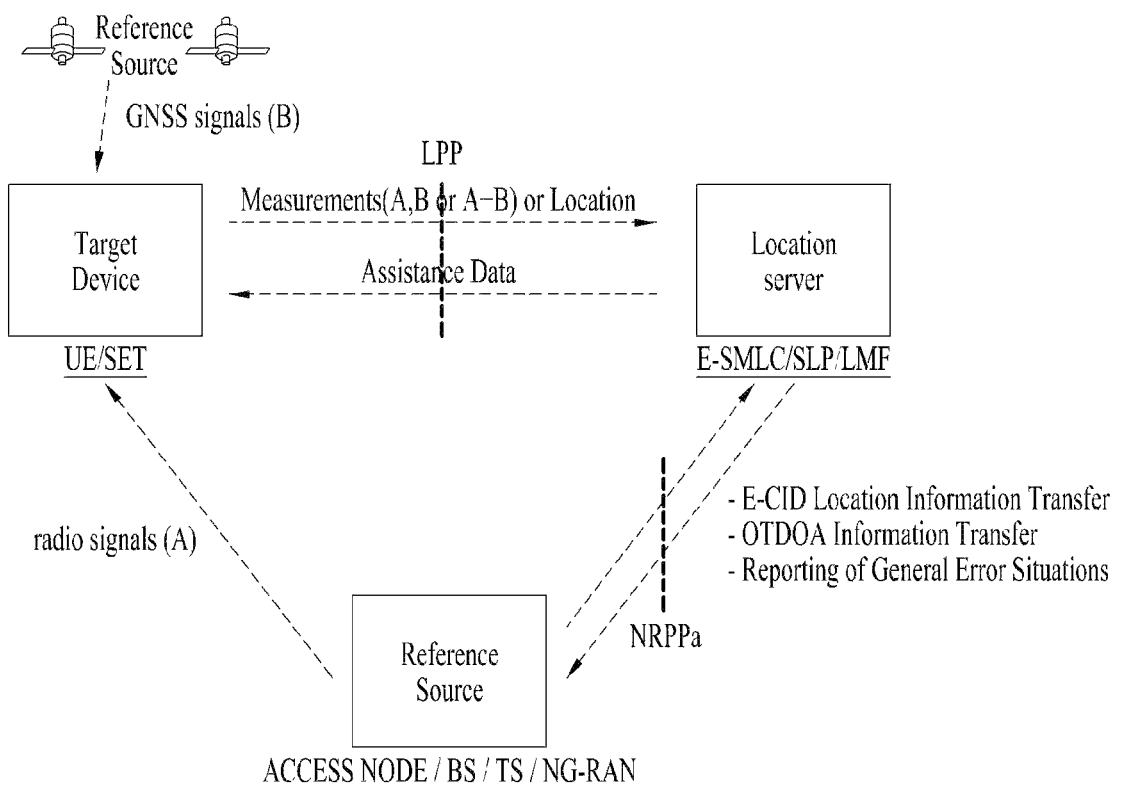
FIG. 8 is a diagram illustrating a positioning protocol configuration for positioning a user equipment (UE), to which various embodiments are applicable.

FIG. 8 is a diagram illustrating an exemplary positioning protocol configuration for positioning a UE, to which various embodiments are applicable.

Referring to FIG. 8, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (positioning reference signal)

For such positioning, a positioning reference signal (PRS) may be used. The PRS is a reference signal used to estimate the position of the UE.

A positioning frequency layer may include one or more PRS resource sets, each including one or more PRS resources.

Sequence generation

A PRS sequence r(m) (m=0,1, . . . ) may be defined by Equation 2.

$$r(m) = \frac{1}{\sqrt{2}}(1 - 2c(m)) + j\frac{1}{\sqrt{2}}(1 - 2c(m+1)) \quad [\text{Equation 2}]$$

c(i) may be a pseudo-random sequence. A pseudo-random sequence generator may be initialized by Equation 3.

$$c_{init} = \left(2^{22} \left\lfloor \frac{n_{ID,seq}^{PRS}}{1024} \right\rfloor + 2^{10}(N_{symb}^{slot}n_{s,f}^{\mu} + l + 1) \right. \quad [\text{Equation 3}]$$
$$\left. (2(n_{ID,seq}^{PRS} \bmod 1024) + 1) + (n_{ID,seq}^{PRS} \bmod 1024)\right) \bmod 2^{31}$$

$n_{s,f}^{\mu}$ may be a slot number in a frame in an SCS configuration $\mu$. A DL PRS sequence ID $n_{ID,seq}^{PRS} \in \{0,1, \ldots, 4095\}$ may be given by a higher-layer parameter (e.g., DL-PRS-SequenceId). l may be an OFDM symbol in a slot to which the sequence is mapped.

Mapping to physical resources in a DL PRS resource

A PRS sequence $r(m)$ may be scaled by $\beta_{PRS}$ and mapped to REs $(k,l)_{p,\mu}$, specifically by Equation 4. $(k,l)_{p,\mu}$ may represent an RE (k,l) for an antenna port p and the SCS configuration $\mu$.

$$\alpha_{k,l}^{(p,\mu)} = \beta_{PRS} r(m) \, m=0,1, \ldots \quad k=mK_{comb}^{PRS}+ \\ ((k_{offset}^{PRS}+k') \bmod K_{comb}^{PRS}) \, l=l_{start}^{PRS}, l_{start}^{PRS}+ \\ 1, \ldots, l_{start}^{PRS}+L_{PRS}-1 \quad [\text{Equation 4}]$$

Herein, the following conditions may have to be satisfied:
The REs $(k,l)_{p,\mu}$ are included in an RB occupied by a DL PRS resource configured for the UE;
The symbol l not used by any SS/PBCH block used by a serving cell for a DL PRS transmitted from the serving cell or indicated by a higher-layer parameter SSB-positionInBurst for a DL PRS transmitted from a non-serving cell;
A slot number satisfies the following PRS resource set-related condition;

$l_{start}^{PRS}$ start is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12,\}$ may be given by a higher-layer parameter transmissionComb. A combination $\{L_{PRS}, K_{comb}^{PRS}\}$ of $L_{PRS}$ and $K_{comb}^{PRS}$ may be one of {2, 2}, {4, 2}, {6, 2}, {12, 2}, {4, 4}, {12, 4}, {6, 6}, {12, 6} and/or {12, 12}. An RE offset $k_{offset}^{PRS} \in \{0,1, \ldots, K_{comb}^{PRS}-1\}$ may be given by combOffset. A frequency offset k' may be a function of $l-l_{start}^{PRS}$ as shown in Table 6.

TABLE 6

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |

TABLE 6-continued

| $K_{comb}^{PRS}$ | Symbol number within the downlink PRS resource $1 - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to slots in a DL PRS resource set

A DL PRS resource included in a DL PRS resource set may be transmitted in a slot and a frame which satisfy the following Equation 5.

$$(N_{slot}^{frame,\mu} n_f + n_{s,f}^{\mu} - T_{offset}^{PRS} - T_{offset,res}^{PRS}) \mod 2^{\mu} T_{per}^{PRS} \in \{iT_{gap}^{PRS}\}_{i=0}^{T_{rep Prs}-1}$$ [Equation 5]

$N_{slot}^{frame,\mu}$ may be the number of slots per frame in the SCS configuration μ. $n^f$ may be a system frame number (SFN). $n_{sf}^{\mu}$ may be a slot number in a frame in the SCS configuration μ. A slot offset $T_{offset}^{PRS} \in \{0,1, \ldots, T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5, 8,10,16,20,32,40,64,80,160,320, 640,1280,2560, 5120, 10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ muting may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture

Figure 9:
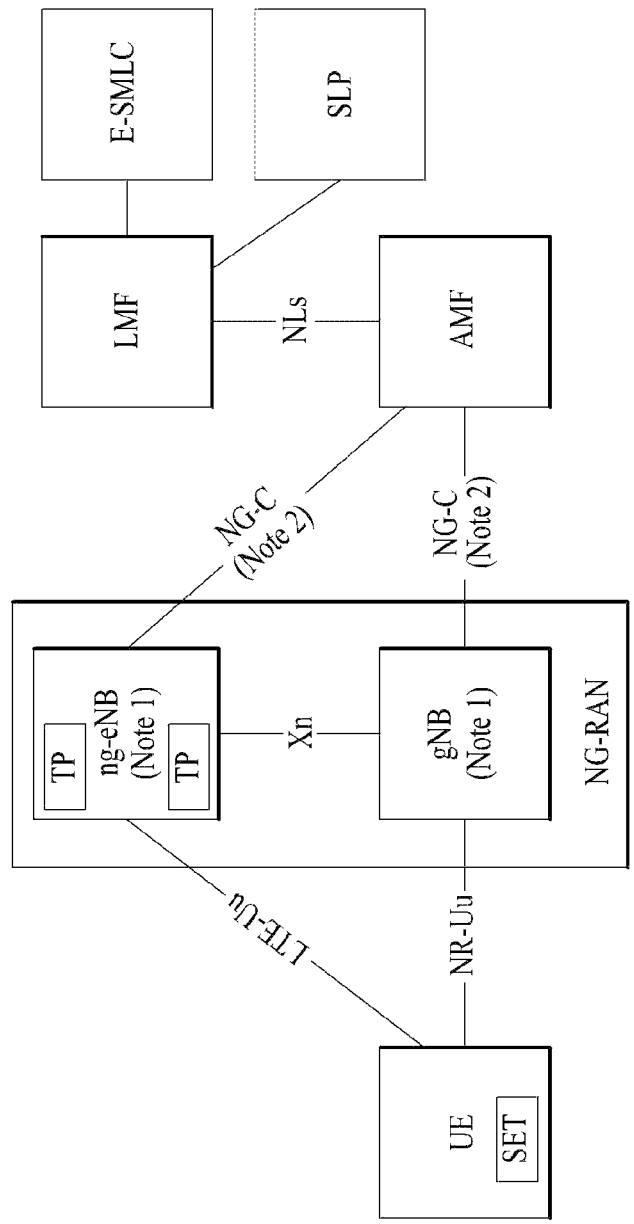
FIG. 9 illustrates an exemplary system architecture for measuring positioning of a UE to which various embodiments are applicable.

FIG. 9 illustrates an exemplary system architecture for measuring positioning of a UE to which various embodiments are applicable.

Referring to FIG. 9, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 10:
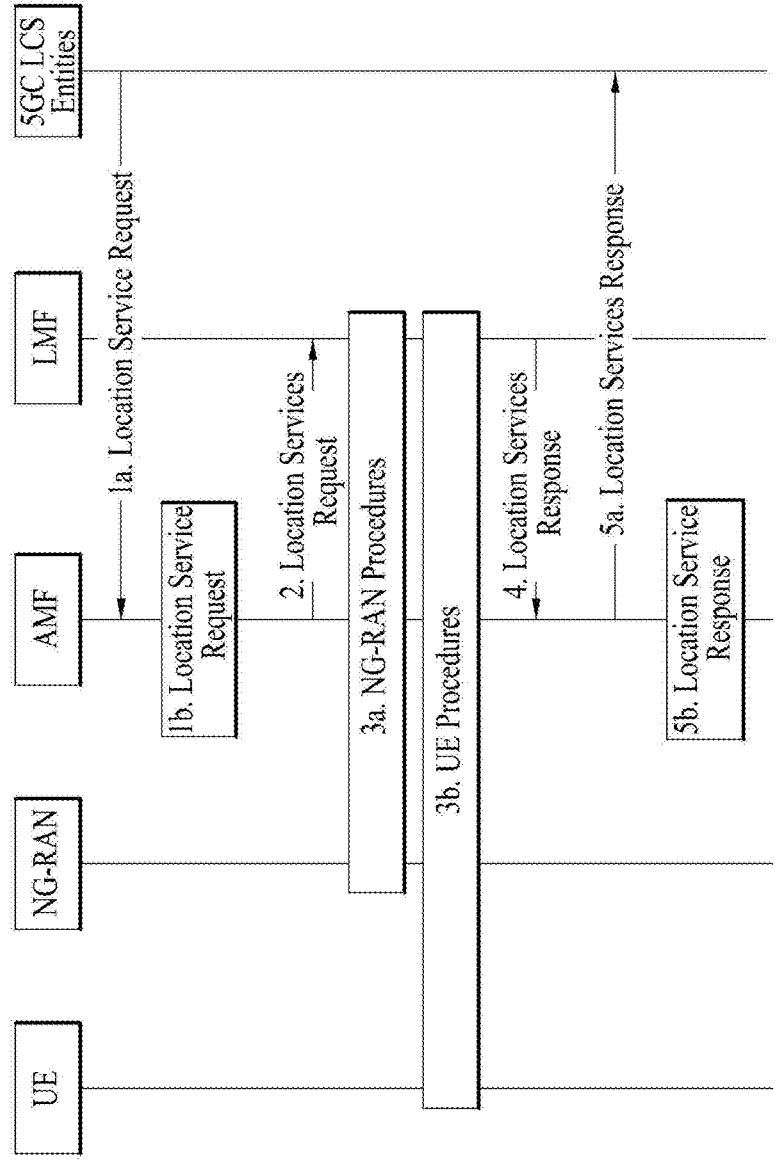
FIG. 10 illustrates an implementation example of a network for UE positioning.

FIG. 10 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 11 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 10. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 11 has been initiated by step 1b, the AMF may use the location service response in order to provide a location service related to an emergency call.

2.5. Positioning Protocol

LTE Positioning Protocol (LPP)

Figure 11:
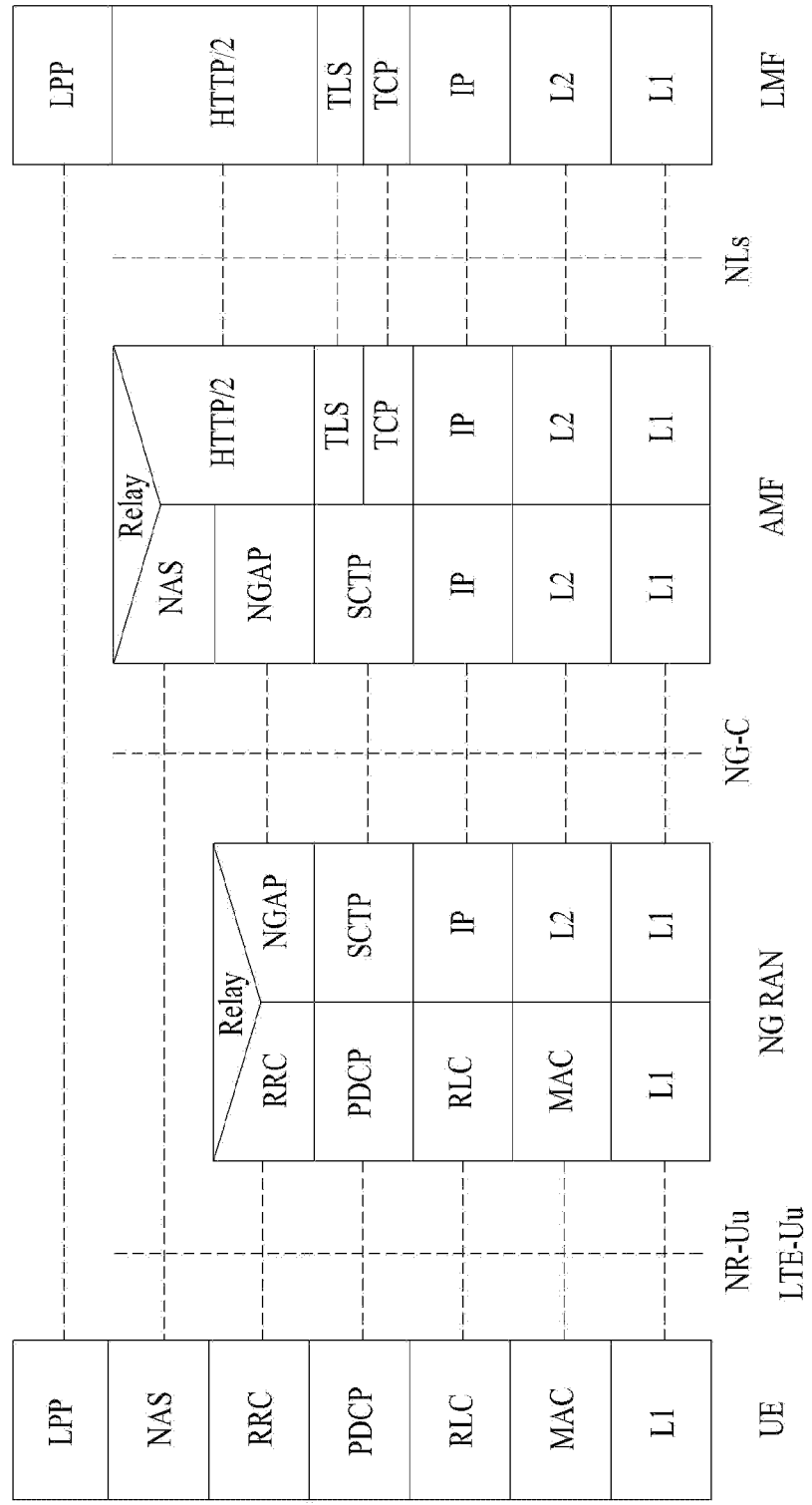
FIG. 11 is a diagram illustrating protocol layers for supporting LTE positioning protocol (LPP) message transmission, to which various embodiments are applicable.

FIG. 11 illustrates an exemplary protocol layer used to support LPP message transfer between an LMF and a UE. An LPP protocol data unit (PDU) may be carried in a NAS PDU between an AMF and the UE.

Referring to FIG. 11, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 12:
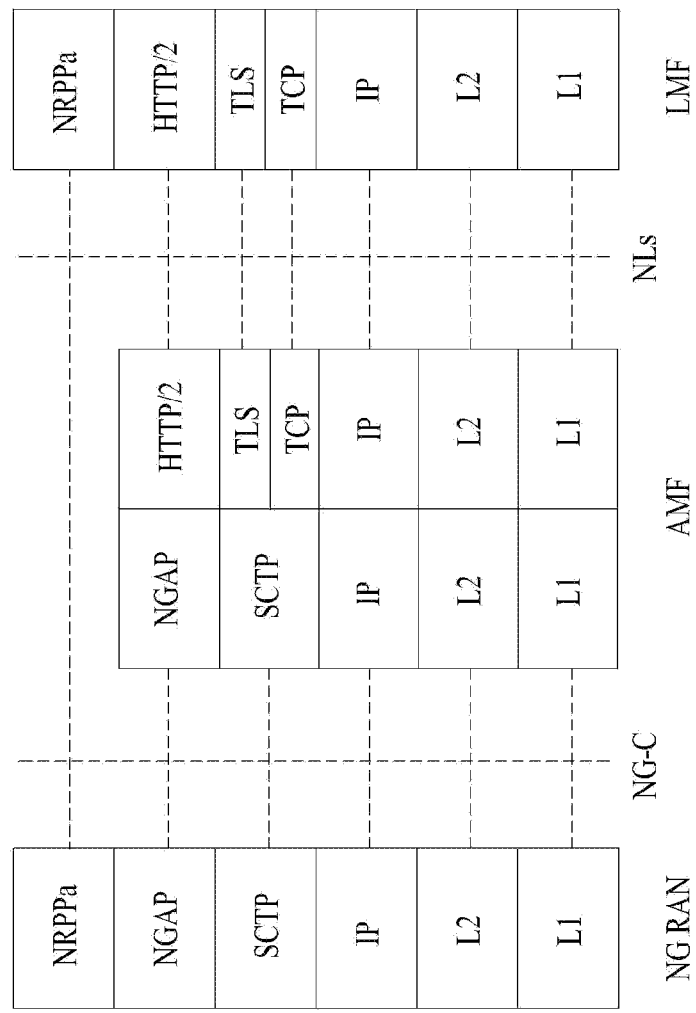
FIG. 12 is a diagram illustrating protocol layers for supporting NR positioning protocol a (NRPPa) protocol data unit (PDU) transmission, to which various embodiments are applicable.

FIG. 12 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

Figure 13:
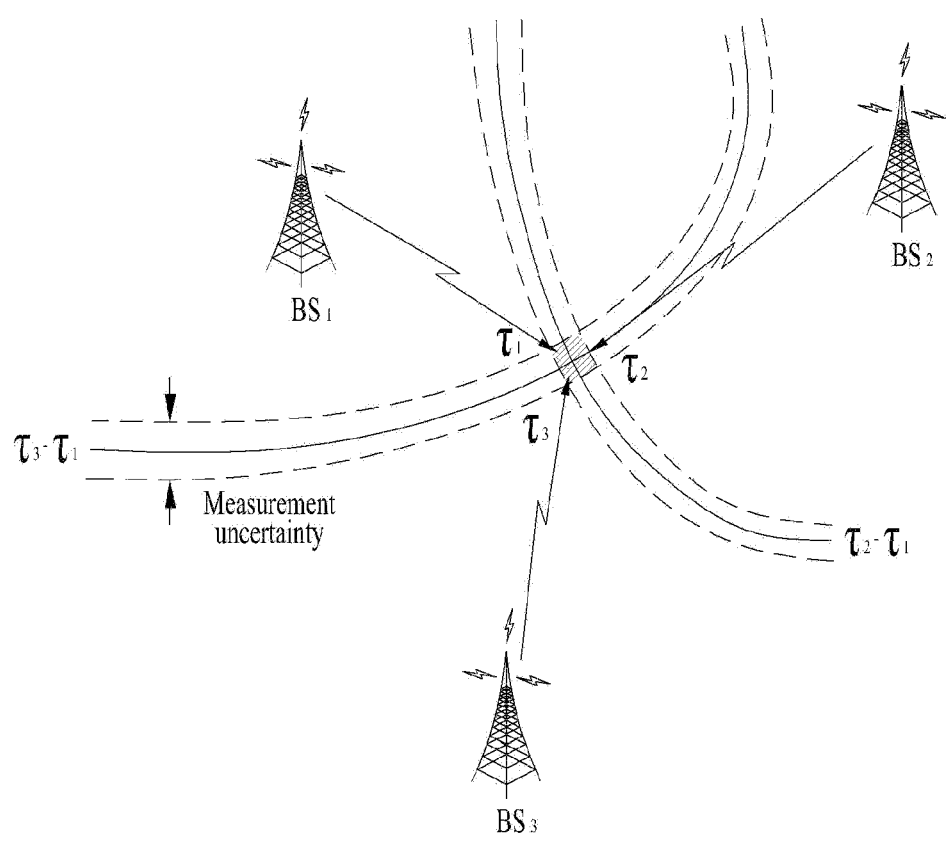
FIG. 13 is a diagram illustrating an observed time difference of arrival (OTDOA) positioning method, to which various embodiments are applicable.

FIG. 13 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 6 below.

$$RSTDi \cdot 1 = \frac{\sqrt{(x_t - x_i)^2 + (y_t - y_i)^2}}{c} - \frac{\sqrt{(x_t - x_1)^2(y_t - y_1)^2}}{c} + (T_i - T_1) + (n_i - n_1) \quad \text{[Equation 6]}$$

In Equation 6, c is the speed of light, $\{x_1, y_1\}$ are (unknown) coordinates of a target UE, $\{x_i, y_i\}$ are (known) coordinates of a TP, and $\{x_1, y_1\}$ are coordinates of a reference TP (or another TP). Here, $(T_i\text{-}T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

$T_{ADV}$ Type 1=(ng-eNB Rx-Tx time difference)+(UE E-UTRA Rx-Tx time difference)

TADV Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-cell RTT)

Figure 14:
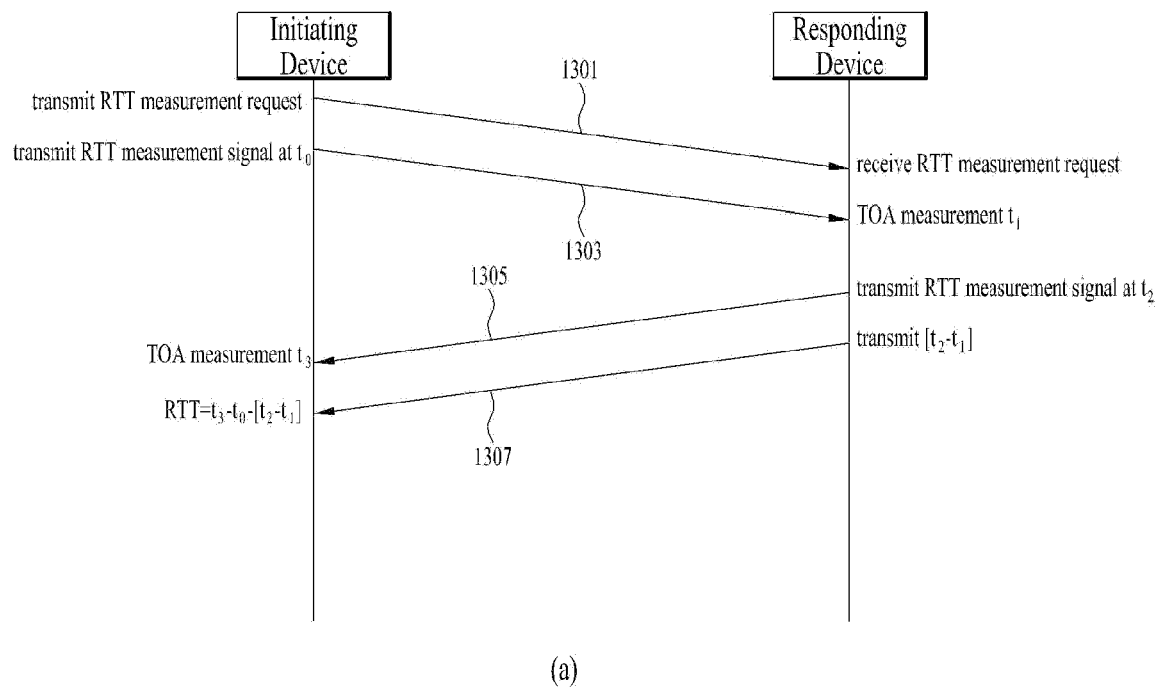
FIG. 14 is a diagram illustrating a multi-round trip time (multi-RTT) positioning method to which various embodiments are applicable.
Figure 14:
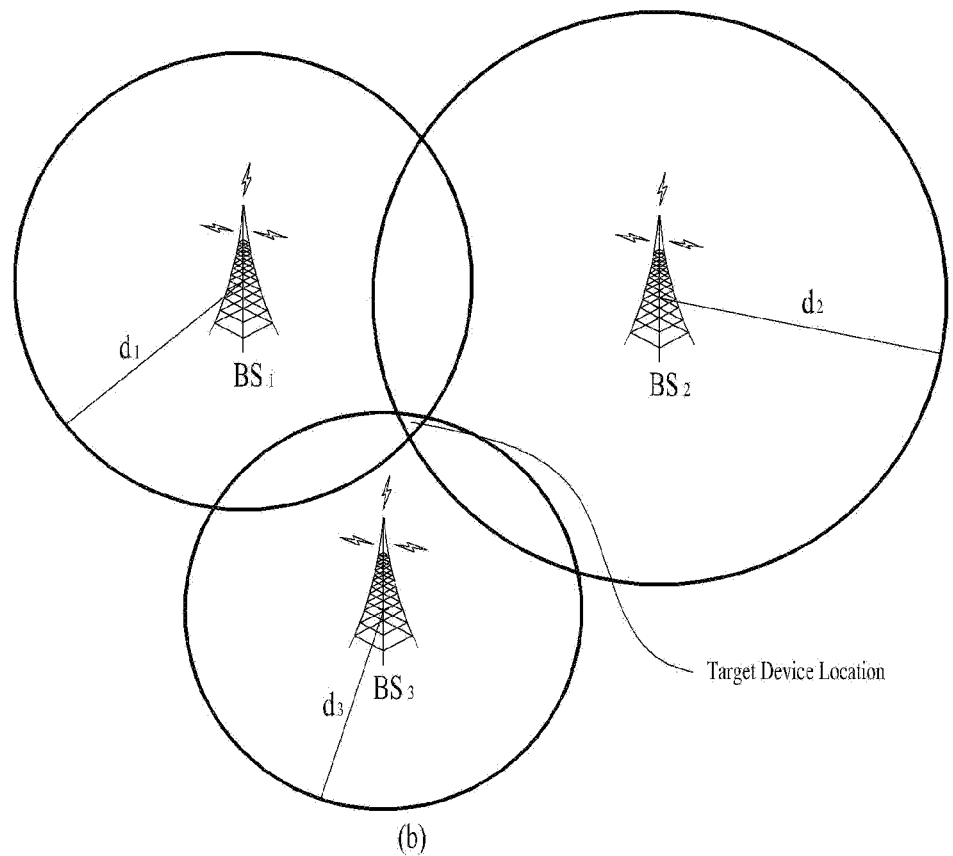

FIG. 14 is a diagram illustrating an exemplary multi-round trip time (multi-RTT) positioning method to which various embodiments are applicable.

Referring to FIG. 14(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 7. The information may be transmitted and received based on a separate signal or in the RTT measurement signal of operation 1305.

$$RTT = t_3 - t_0 - [t_2 - t_1] \quad \text{[Equation 7]}$$

Referring to FIG. 14(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 7 shows an exemplary SRS request field.

TABLE 7

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $1^{st}$ set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |

TABLE 7-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in apenodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

In Table 14 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
CSI-RS: channel state information reference signal
ECID: enhanced cell identifier
LMF: location management function
MAC: medium access control
MAC-CE: MAC-control element
NRPPa: NR positioning protocol a
OTDOA (OTDoA): observed time difference of arrival
PRS: positioning reference signal
RAT: radio access technology
RS: reference signal
RTT: round trip time
RSRP: reference signal received power
RSRQ: reference signal received quality
RSTD: reference signal time difference/relative signal time difference
SINR: signal to interference plus noise ratio)
SNR: signal to noise ratio
SRS: sounding reference signal. According to various embodiments, the SRS may be used for UL channel estimation using multi input multi output (MIMO) and positioning measurement. In other words, according to various embodiments, the SRS may include a normal SRS and a positioning SRS. According to various embodiments, the positioning SRS may be understood as a UL RS that is configured for positioning of the UE and/or used for positioning of the UE. According to various embodiments, the normal SRS may be compared with the positioning SRS and may be understood as a UL RS that is configured for UL channel estimation and/or used to for UL channel estimation (and/or configured for UL channel estimation and positioning and/or used for UL channel estimation and positioning). According to various embodiments, the positioning SRS may also be referred to as an SRS for positioning, etc. In the description of various embodiments, terms such as the positioning SRS and the SRS for positioning may be used interchangeably and may be understood to have the same meaning. According to various embodiments, the normal SRS may also be referred to as a legacy SRS, a MIMO SRS, an SRS for MIMO, or the like. In the description of various embodiments, terms such as the normal SRS, the legacy SRS, the MIMO SRS, and the SRS for MIMO may be used interchangeably and may be understood to have the same meaning. For example, the normal SRS and the positioning SRS may be configured/indicated separately. For example, the normal SRS and the positioning SRS may be configured/indicated from different information elements (IEs) of a higher layer. For example, the normal SRS may be configured based on an SRS-resource. For example, the positioning SRS may be configured based on SRS-PosResource.

SS: synchronization signal
SSB: synchronization signal block
SS/PBCH: synchronization signal/physical broadcast channel
TA: timing advance/time advance
TDOA (TDoA): timing difference of arrival
TOA (ToA): time of arrival
TRP: transmission and reception point (TP: transmission point)
UTDOA (UTDoA): uplink time difference of arrival In the description of various embodiments, a BS may be understood as a comprehensive term including a remote radio head (RRH), an eNB, a gNB, a TP, a reception point (RP), a relay, and the like.

In the description of various embodiments, the expression 'greater than/above A' may be replaced with the expression 'above/greater than A'.

In the description of various embodiments, the expression 'less than/below B' may be replaced with the expression 'below/less than B'

Figure 15:
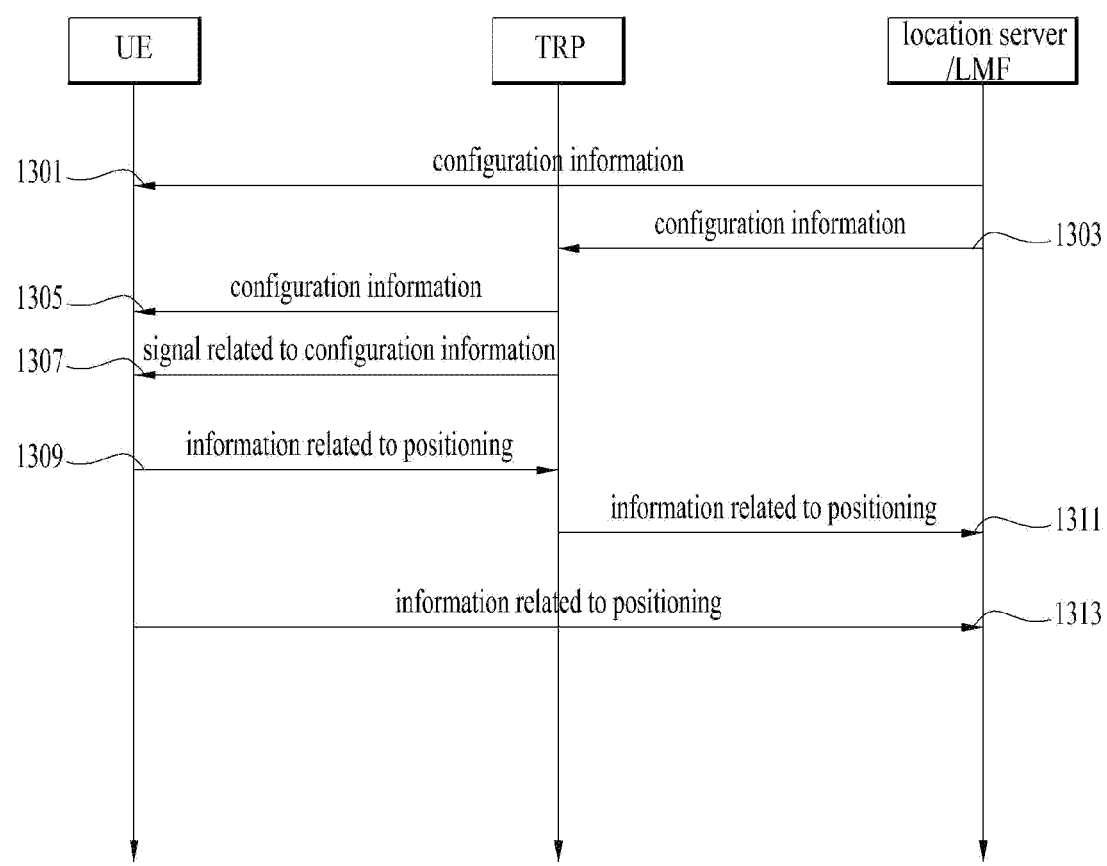
FIG. 15 is a simplified diagram illustrating a method of operating a UE, a transmission and reception point (TRP), a location server, and/or a location management function (LMF) according to various embodiments.

FIG. 15 is a simplified diagram illustrating an operating method of a UE, a TRP, a location server, and/or an LMF according to various embodiments.

Referring to FIG. 15, in operation 1301 according to various embodiments, the location server and/or the LMF may transmit configuration indicated to the UE and the UE may receive the configuration information.

In operation 1303 according to various embodiments, the location server and/or the LMF may transmit reference configuration information to the TRP and the TRP may receive the reference configuration information. In operation 1305 according to various embodiments, the TRP may transmit the reference configuration information to the UE and the UE may receive the reference configuration information. In this case, operation 1301 according to various embodiments may be omitted.

In contrast, operations 1303 and 1305 according to various embodiments may be omitted. In this case, operation 1301 according to various embodiments may be performed.

That is, operation 1301 according to various embodiments, and operations 1303 and 1305 according to various embodiments may be selectively performed.

In operation 1307 according to various embodiments, the TRP may transmit a signal related to the configuration information and the UE may receive the signal related to the configuration information. For example, the signal related to the configuration information may be a signal for positioning of the UE.

In operation 1309 according to various embodiments, the UE may transmit a signal related to positioning to the TRP and the TRP may receive the signal related to positioning. In operation 1311 according to various embodiments, the TRP may transmit the signal related to positioning to the location server and/or the LMF and the location server and/or the LMF may receive the signal related to positioning.

In operation 1313 according to various embodiments, the UE may transmit the signal related to positioning to the location server and/or the LMF and the location server and/or the LMF may receive the signal related to positioning. In this case, operations 1309 and 1311 according to various embodiments may be omitted.

In contrast, operation 1313 according to various embodiments may be omitted. In this case, operations 1309 and 1311 according to various embodiments may be performed.

That is, operations 1309 and 1311 according to various embodiments, and operation 1313 according to various embodiments may be selectively performed.

According to various embodiments, the signal related to positioning may be obtained based on the configuration information and/or the signal related to the configuration information.

Figure 16:
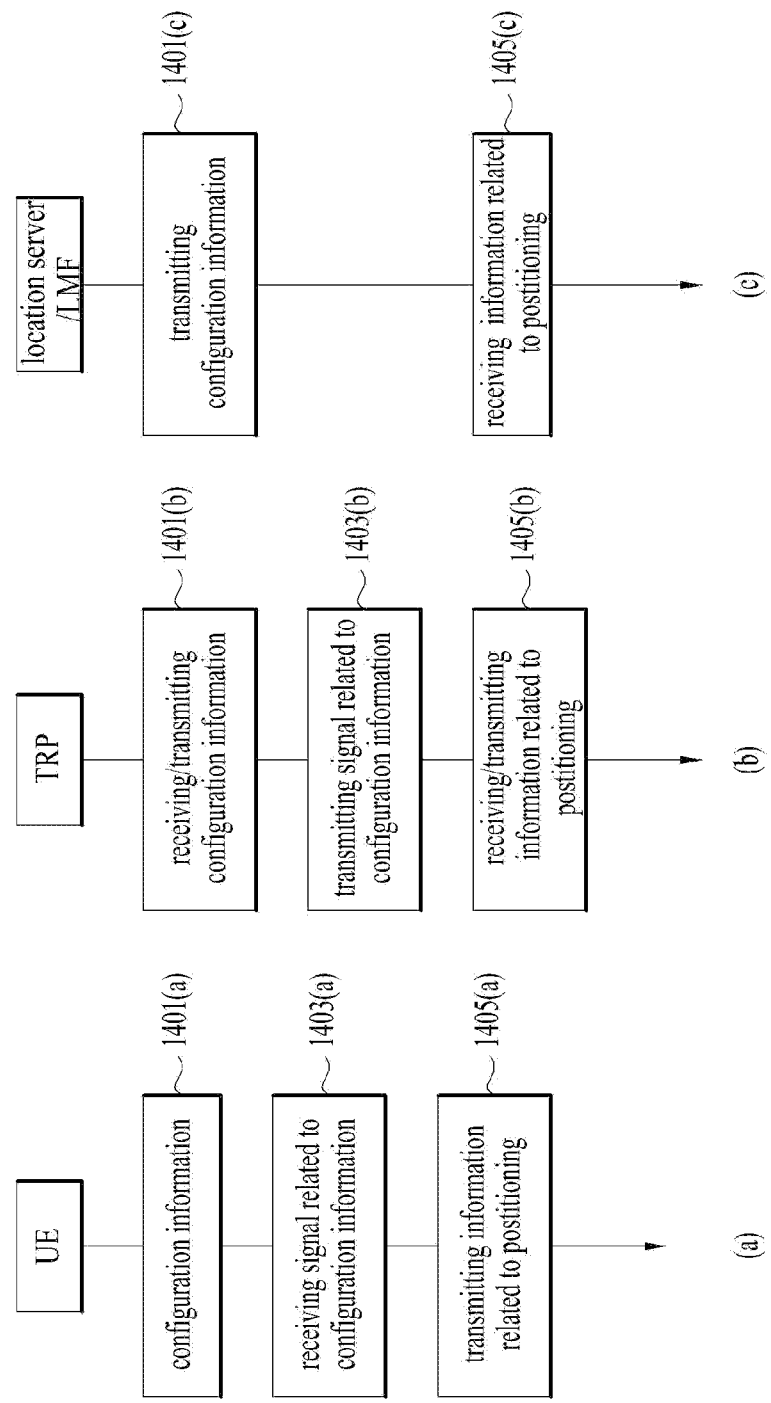
FIG. 16 is a simplified diagram illustrating a method of operating a UE, a TRP, a location server, and/or an LMF according to various embodiments.

FIG. 16 is a simplified diagram illustrating an operating method of a UE, a TRP, a location server, and/or an LMF according to various embodiments.

Referring to FIG. 16(a), in operation 1401(a) according to various embodiments, the UE may receive configuration information.

In operation 1403(a) according to various embodiments, the UE may receive a signal related to the configuration information.

In operation 1405(a) according to various embodiments, the UE may transmit information related to positioning.

Referring to FIG. 16(b), in operation 1401(b) according to various embodiments, the TRP may receive configuration information from the location server and/or the LMF and transmit the configuration information to the UE.

In operation 1403(b) according to various embodiments, the TRP may transmit a signal related to the configuration information.

In operation 1405(b) according to various embodiments, the TRP may receive information related to positioning and transmit the information related to positioning to the location server and/or the LMF.

Referring to FIG. 16(c), in operation 1401(c) according to various embodiments, the location server and/or the LMF may transmit configuration information.

In operation 1405(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

When the UE transmits a positioning SRS, required transmission power may be higher than available transmission power or high transmission power may be required compared to location or channel environments. In this case, if the UE attempts transmission on a normal UL carrier even though the UE uses all available power, the BS may experience reception performance degradation or fail to receive the transmission. In addition, since it is difficult for the BS to estimate the location of the UE and the channel to the UE, it is necessary to improve the transmission of the UE to increase the reception performance of the BS. To solve the above issue, the UE may transmit the positioning SRS in supplementary uplink (SUL). However, if the UE transmits the SRS on the SUL by applying power configured for a higher bandwidth, which is configured before switching to the SUL, it may act as interference to a neighboring BS or causes a waste of power in the UE. Therefore, an additional power mechanism may be required.

In wireless communication systems to which various embodiments are applicable (e.g., NR system) (hereinafter, the NR system will be described as an example), a carrier may be located anywhere in the spectrum. The frequency position of the carrier is not separately specified in the specifications on physical layers of the NR system, prescribed constraints may be introduced in practice for simplification in terms of radio frequency (RF) implementation. In the LTE system, a carrier raster of 100 kHz may be supported for the same purpose. In the NR system, a different raster may be configured depending on the carrier frequency. For example, rasters of 5, 15, and 60 kHz may be used for the following frequency bands: 3 GHz, 3 to 24.25 GHz, and above 24.25 GHz, respectively. Each value may be related to the SCS depending on each frequency band. For frequency bands below 3 GHz, compatibility with the 100 kHz raster of LTE system may be considered.

In the LTE system, the raster may be used to determine a frequency location as part of the initial access procedure. On the other hand, considering that in the NR system, a carrier with a wider area and/or a larger number of BWPs (and/or according to the introduction of a BWP) need to be searched for compared to the LTE system, a delay may occur if the corresponding raster is used. Therefore, in the NR system, the raster used in the initial access procedure, that is, the synchronization raster, may be configured separately. The interval between synchronization rasters may be set wider than that of carrier rasters.

The NR system may support CA. For example, a maximum of 16 carriers may be aggregated and transmitted in the NR system. The carrier may be understood as a cell and/or may include a cell. A UE supporting the CA may communicate with a plurality of cells. For example, the cell that the UE initially searches for may be a PCell. One or multiple cells indicated/configured to the UE after entering a radio resource control (RRC) connected state may be SCell(s). The SCell may be activated/deactivated depending on data traffic, and each UE may be configured with a different SCell. The amount of DL/UL traffic of each cell may or may not be the same. This may be because the amount of DL traffic is relatively larger than that of UL traffic, and combining DL cells has relatively less RF complexity than combining UL cells. In the case of controlling signaling, there may be overload when hybrid automatic repeat request (HARQ) feedback related to multiple DL links is transmitted over a PUCCH in a single PCell, due to the asymmetric CA environment. A PUCCH group may be configured to divide and transmit information on the corresponding PUCCH. In a wireless communication system supporting Release-16 technical specification (TS) standard technology, a maximum of two groups may be configured. For example, for PUCCH group #0, HARQ information on related groups may be transmitted in the PCell, and for PUCCH group #1, the HARQ information may be transmitted in a PSCell.

In addition to the above-described CA, NR may also support SUL. The SUL refers to a UL carrier associated with a normal DL/UL (non-SUL) carrier, and the SUL exists in a low frequency band. For example, when a DL/UL (non-SUL) carrier paired with SUL operates in a band of 3.5 GHz, the paired SUL may exist and operate at 800 MHz. The purpose of the SUL is to increase UL coverage by using a low frequency band, and more particularly, by lowering the path loss in a relatively poor channel environment. In NR, non-SUL and SUL may not be used at the same time to transmit a UL signal. According to various embodiments, when the BS/server additionally provides resource allocation information related to SUL to the UE in addition to non-SUL, the UE may have a power limitation when transmitting a positioning SRS to support multi-cell round trip time (RTT), UTDOA, and UL-AOA. Accordingly, the present disclosure proposes transmission based on SUL and power control therefor. The details described in various embodiments are applicable to a MIMO SRS as well as a positioning SRS.

SRS Transmission Based on SUL

Method 1: The BS/server directly indicates SUL transmission.

According to Method 1, the BS/server may instruct the UE to directly transmit a positioning SRS on SUL through higher layer signaling (e.g., RRC signaling) or DCI (on a PDCCH) in non-SUL by measuring a UL channel of the UE and considering the maximum available transmission power based on other UL signals transmitted from the UE before the positioning SRS transmission. In the case of the DCI, one bit among bit fields may be used. Additionally, the BS/server may instruct the UE to perform the SUL transmission according the measurement result of a DL channel, which is measured by the UE. In this case, the UE may report the measurement result of the DL channel based on a DL RS (e.g., SSB, CSI-RS, PRS, etc.) before the positioning SRS transmission. The BS/server may indicate a UL (non-SUL) carrier and/or an SUL carrier for the SRS to the UE based on the corresponding information according to the above method.

Method 2: The UE selectively performs non-SUL transmission or SUL transmission.

According to Method 2, the UE may autonomously select either non-SUL or SUL based on a specific condition. Here, the specific condition may be a threshold related to the received signal strength of a path loss reference signal (PL RS) or a DL RS. The DL RS may be an SSB, a CSI-RS, or a PRS. Considering that a positioning SRS has a lower priority than other UL signals (e.g., PRACH, PUCCH, PUSCH, etc.), a problem may occur when the UE transmits the positioning SRS on the SUL together with other UL signals. However, for special environments such as industrial Internet of Things (IIOT), since location information may have a higher priority than a PUSCH, a PUCCH, or data transmission, the UE may prioritize the transmission of the positioning SRS on the SUL rather than scheduled data transmission. If the positioning related measurement result based on the DL RS is less than or equal to a threshold specified by the BS, the UE may transmit the positioning SRS on the SUL. However, if the positioning SRS transmission overlaps with PRACH transmission at the corresponding time, the UE may transmit the PRACH rather than the positioning SRS. Additionally, the BS/server may indicate the number of times that the positing SRS is repeated and information on a periodicity thereof in system information, RRC signaling, and a medium access control (MAC) control element (CE), by considering a case in which the UE does not satisfy the given specific condition so that the UE is incapable of transmitting the positioning SRS on the SUL or a case in which the reception performance of the BS is enhanced. If the UE is allowed to repeatedly transmit with a predetermined periodicity as many times as specified by the BS even though the UE has no choice but to transmit on the non-SUL, it may improve the performance based on diversity in the time and spatial domains.

Method 3: The UE performs non-SUL transmission and SUL transmission simultaneously or on each hop.

According to Method 3, the BS may configure all resources related to a positioning SRS for both non-SUL and SUL. The UE may transmit the positioning SRS on all specified resources, the UE may transmit the SRS on the non-SUL and then transmit the SRS on the SUL in the next attempt, or the UE may first transmit the positioning SRS on the SUL and then transmit the positioning SRS on the non-SUL. According to Method 3, overhead is required in terms of time/frequency resources and power, but it may give better results in terms of accuracy. The hop pattern may be transmitted in system information, or the hop pattern may be a predetermined rule (for example, the hop pattern may be determined according to the predetermined rule).

According to various embodiments, whether the UE transmits a positioning SRS on either non-SUL or SUL may be determined in association with a physical cell ID, UE ID, or SRS sequence ID. For this method, the modular operation may be used, and the modular variable may be any one of PCID, UE ID, and SRS_ID. For example, if the result of PCID mod 2 operation is '0', the UE may transmit the positioning SRS first on the SUL. On the other hand, if the result is '1', the UE may transmit the positioning SRS first on UL (non-SUL). Here, PCID denotes a physical cell ID, which may be servingCellId or physCellId indicated by higher layers. In addition, the ID of the UE (UE ID) may be a remainder of dividing an international mobile subscriber identity (IMSI) by 1024, i.e., a value of IMSI mod 1024. According to various embodiments, whether the UE transmits the positioning SRS on either the non-SUL or SUL may be considered in association with the SRS sequence ID (SRS_ID) used for SRS sequence generation. The SRS sequence ID may be sequenceId, which is a parameter indicated by higher layers.

Power control of SRS through SUL

Hereinafter, power control when a positioning SRS is transmitted on SUL according to the above-described methods will be described. The power of the positioning SRS may be based on open-loop power control as shown in Table 8 below.

TABLE 8

If a UE transmits SRS based on a configuration by IE SRS-Positioning-Config on active UL BWP b of carrier f of serving cell c, the UE determines the SRS transmission power $P_{SRS,b,f,c}(i, q_s)$ in SRS transmission occasion i as $$P_{SRS,b,f,c}(i, q_s) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) \end{Bmatrix}$$

[dBm]

where, $P_{O,SRS,b,f,c}(q_s)$ and $\alpha_{O,SRS,b,f,c}(q_s)$ are provided by p0 and alpha respectively, for active UL BWP b of carrier f of serving cell c, and SRS resource set $q_s$ is indicated by SRS-ResourceSetId from SRS-ResourceSet, and $PL_{b,f,c}(q_d)$ is a downlink pathloss estimate in dB calculated by the UE, as described in Clause 7.1.1 in case of an active DL BWP of a serving cell c, using RS resource indexed $q_d$ in a serving or non-serving cell for SRS resource set $q_s$ [6, TS 38.214]. A configuration for RS resource index qa associated with SRS resource set $q_s$ is provided by pathlossReferenceRS if a ssb-Index is provided, referenceSignalPower is provided by ss-PBCH-BlockPower if a dl-PRS-ResourceId is provided, referenceSignalPower is provided by dl-PRS-ResourcePower If the UE determines that the UE is not able to accurately measure $PL_{b,f,c}(q_d)$, the UE calculates $PL_{b,f,c}(q_d)$ using a RS resource obtained from the SS/PBCH block that the UE uses to obtain MIB The UE indicates a capability for a number of pathloss estimates that the UE can simultaneously maintain.

When the UE transmits a positioning SRS on SUL as described above, it may not be necessary to transmit a reference signal for PL measurement, which is required for the UE to perform UL transmission, because the SUL is based on a paired spectrum (e.g., frequency division duplexing (FDD), frequency division duplex, frequency domain sharing, etc.) due to the characteristics thereof. Accordingly, the UE may attempt SRS transmission on the SUL by applying a DL PL measured on non-SUL. However, since the UE switches to a low BWP, there may be a change in the channel environment according to the carrier change. If the UE performs transmission on the SUL based on a PL that is measured based on a DL RS (e.g. SSB, CSI-RS, RS, etc.) before the switching, it may cause power consumption in the UE. Accordingly, the BS/server may provide a compensation value for power loss that occurs during the switching to the low BWP in higher layer signaling (RRC) or system information.

The compensation value for power loss may be determined as shown in Equation 8 below. The corresponding compensation value may be determined in the form of a product of a pathloss exponent value.

$$P_{SRS,b,f_{SUL},c}(i,q_s) = P_{RSR,b,f,c}(i,q_s) + \delta_{SUL} \quad \text{[Equation 8]}$$

In Equation 8, $P_{SRS,b,f_{SUL},c}(i,q_s)$ denotes the transmission power of the UE after SUL switching, and $P_{SRS,b,f,c}(i,q_s)$ denotes the transmission power of the UE before the switching. In addition, $\delta_{SUL}$ denotes a compensation value for compensating for power for the SUL switching indicated by the BS/server as described above. That is, as shown in Equation 8, the UE may apply a PL value based on a previous DL RS after the SUL switching and transmit by applying the compensation value additionally. For the value of $\delta_{SUL}$, a value range indicated by a transmission power control (TPC) command is used as it is. Alternatively, the value of $\delta_{SUL}$ may be given by the BS/server to the UE, or a new range of values may be configured.

When the UE transmits a positioning SRS, resources required for the corresponding signal transmission may be configured. The corresponding information may be related to a resource and a resource set, which consists of multiple resources, and the information may include information necessary for beams and transmission power. In this case, a physical cell ID for referring to an associated beam may be designated for each resource, and information on a PL RS regarding power to be transmitted on each resource may be designated by a resource set configuration. The transmission power may be calculated and transmitted based on the RS information. However, considering that one PL RS is configured for each set, the UE may transmit the SRS in a state in which an inappropriate beam direction and unnecessary power are configured if a physical cell ID to be referenced for spatial beam information on the resource is different from a physical cell ID for obtaining the PL RS.

For a NR SRS, the UE may be configured with one or more SRS resource sets from higher layers. Each resource set may include a plurality of resources. The maximum number of resources in the resource set may depend on the capability of the UE, or the maximum number of resources may be designated by higher layers. The resource set, which is a group of resources, may be used differently depending on the purpose (beam management, codebook, non-codebook, antenna switching, etc.). Resources included in one resource set may not be transmitted simultaneously at one point in time, but resources included in different resource sets may be transmitted simultaneously. SRS transmission in the time domain may be largely divided into periodic transmission, semi-persistent transmission, and aperiodic transmission, and related information may be transmitted as a resource type by higher layers.

Resources of an SRS for positioning may be related to beams. An RS associated with each resource may be indicated by higher layers as shown in Table 9 below. In this case, a physical cell ID to be referenced may also be included.

TABLE 9

```
SRS-SpatialRelationInfoPos-r16 ::=    SEQUENCE {
  servingCellId-r16                     ServCellIndex              OPTIONAL, -- Need S
  referenceSignal-r16                   CHOICE {
    ssb-IndexServing-r16                  SSB-Index,
    csi-RS-IndexServing-r16               NZP-CSI-RS-ResourceId,
    srs-SpatialRelation-r16             SEQUENCE {
      resourceSelection-r16               CHOICE {
        srs-ResourceId-r16                  SRS-ResourceId,
        srs-PosResourceId-r16               SRS-PosResourceId-r16
      },
  uplinkBWP-r16                         BWP-Id
  },
  ssbNcell-r16                          SSB-InfoNcell-r16,
  dl-PRS-r16                            DL-PRS-Info-r16
  }
}
```

When the UE transmits the SRS for positioning on the corresponding resource, the power used by the UE may be determined based on the resource set configuration. A PL RS (e.g., synchronization signal and physical broadcast channel block (SSB), channel state information reference signal (CSI-RS), downlink positioning reference signal (DL-PRS), etc.) to be used by the UE for PL measurement may be designated, which may include information on the physical cell ID of a neighbor or serving cell.

TABLE 10

```
SRS-PosResourceSet-r16 ::=    SEQUENCE {
  srs-PosResourceSetId-r16      SRS-PosResourceSetId-r16,
  srs-PosResourceIdList-r16     SEQUENCE (SIZE(1..
maxNrofSRS-ResourcesPerSet)) OF SRS-PosResourceId-r16
                                                        OPTIONAL, --
Cond Setup
  resourceType-r16              CHOICE {
    aperiodic-r16                 SEQUENCE {
      aperiodicSRS-ResourceTriggerList-
r16                             SEQUENCE
(SIZE(1..maxNrofSRS-TriggerStates-1))
                                  OF  INTEGER    (1..maxNrofSRS-
TriggerStates-1) OPTIONAL, -- Need M
      slotOffset-r16                INTEGER (1..32)
```

TABLE 10-continued

```
OPTIONAL, -- Need S
    ...
    },
    semi-persistent-r16         SEQUENCE {
        ...
    },
    periodic-r16                SEQUENCE {
        ...
    }
    },
    alpha-r16                                           Alpha
OPTIONAL, -- Need S
    p0-r16                              INTEGER (–202..24)
OPTIONAL, -- Cond Setup
    pathlossReferenceRS-Pos-r16     CHOICE {
        ssb-Index-16               SSB-Index,
        csi-RS-Index-r16           NZP-CSI-RS-ResourceId,
        ssb-r16                    SSB-InfoNcell-r16,
        dl-PRS-r16                 DL-PRS-Info-r16
    }                                                OPTIONAL, --
Need M
    ...
}
SSB-InfoNcell-r16 ::=       SEQUENCE {
    physicalCellId-r16         PhysCellId,
    ssb-IndexNcell-r16         SSB-Index,
    ssb-Configuration-r16                     SSB-Configuration-r16
OPTIONAL -- Need M
}
```

In this case, if physical cell ID information for referring to an RS having a spatial relationship with each resource is different from reference physical cell ID information for calculating the PL of transmission power, the transmission power may be consumed unnecessarily. Accordingly, methods of solving such an issue will be proposed in various embodiments.

Method 1: The Same Reference Physical Cell ID is Configured for a Resource Set and all Subordinate Resources.

According to Method 1, when configuring information on an SRS for positioning, the BS/server may always configure the same value for spatial relation information associated with a resource and a neighbor cell ID to be referenced for a PL RS. According to this method, the BS may equally configure cells having a spatial relationship with resources and cells for measuring the PL RS and then configure as many resource sets as the number of neighboring cells acceptable by the UE additionally, thereby solving a problem that physical cell IDs are mismatched between resources and resource sets.

Method 2: Multiple PL RSs are Configured.

According to Method 2, when configuring information on a resource set, the BS/server may configure a plurality of PL RSs and additionally configure information on resources related to the PL RSs. For example, a plurality of PL RSs in a resource set and the same number (N) of reference neighbor cell IDs, which are one-to-one mapped thereto, may be transmitted. Then, the PL RSs may be associated with (M) resources included in the resource set. For example, it is assumed that there are two PL RSs: PL RSs #0 and #1 in a single resource set, a physical cell ID is associated with each, and there are 8 resources (resources #0 to #7), four resources among the 8 resources may be automatically related to PL RSs #0 and #1 sequentially. When an SRS is transmitted on resource #3, transmission power may be calculated and transmitted based on the PL RS of physical cell ID #0. Alternatively, information on reference physical cell IDs of a plurality of PL RSs trans- mitted in a set with a spatial relationship with each resource may be indicated directly by an index such as #0 or #1.

Figure 17:
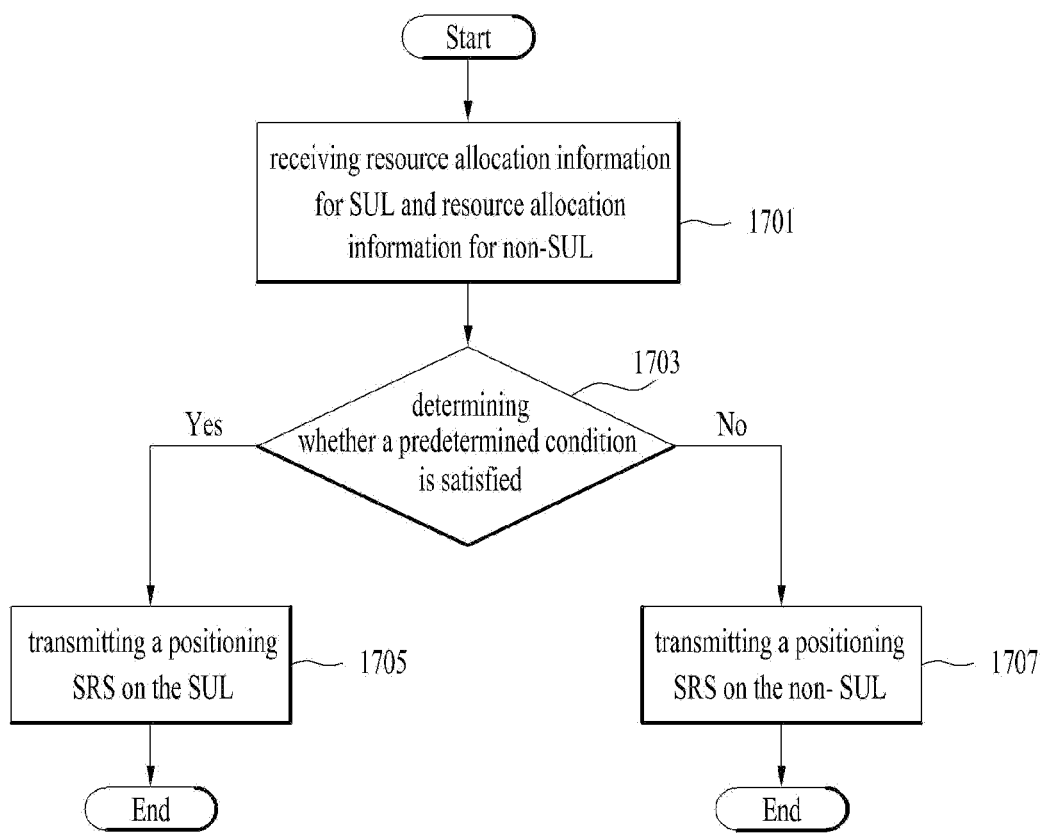
FIG. 17 is a flowchart illustrating a method of operating a UE according to various embodiments.

In various embodiments, a method for the BS to estimate the location of the UE when the UE performs simultaneous transmission on a plurality of resources with the same spatial beam will be described. The BS may estimate the location of the UE by calculating the average received power of each SRS received on multiple resources. Alternatively, the BS may the estimate the location of the UE based on the highest received power FIG. 17 is a flowchart illustrating a method of operating a UE according to various embodiments.

The UE may receive resource allocation information on SUL and resource allocation information on non-SUL (1701).

The UE may determine whether to transmit a positioning SRS on either the SUL or the non-SUL based on satisfaction of any one of predefined conditions (1703).

When any one of the predefined conditions is satisfied (based on that the predefined conditions are satisfied), the UE may transmit the positioning SRS on the SUL (1705).

When none of the predefined conditions are satisfied (based on that the predefined conditions are not satisfied), the UE may transmit the positioning SRS on the non-SUL (1707).

As described above in various embodiments, the predefined conditions may be that the BS/server directly indicates SUL transmission. Alternatively, the predefined conditions may be a threshold related to the strength of a DL RS specified by the BS/server. In this case, the threshold may be separately given for each RS received by the UE.

Figure 18:
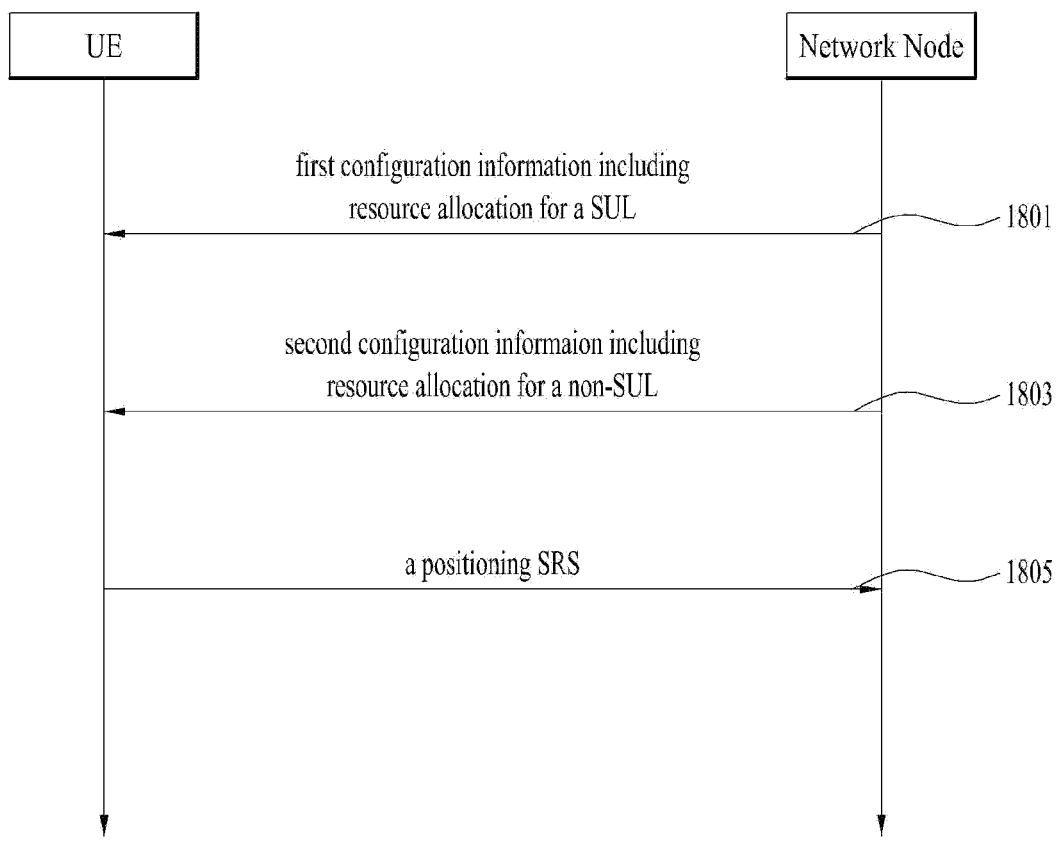
FIG. 18 is a diagram schematically illustrating a method of operating a UE and a network node according to various embodiments.

FIG. 18 is a diagram schematically illustrating a method of operating a UE and a network node according to various embodiments. For example, the network node may be a TP, a BS, a cell, a location server, an LMF, and/or any device performing the same operation.

The UE may receive resource allocation information on SUL from the network node (1801).

The UE may receive resource allocation information on non-SUL (1803).

The UE may transmit a positioning SRS based on the resource allocation information, and the positioning SRS may be transmitted on the SUL or non-SUL (1805).

Figure 19:
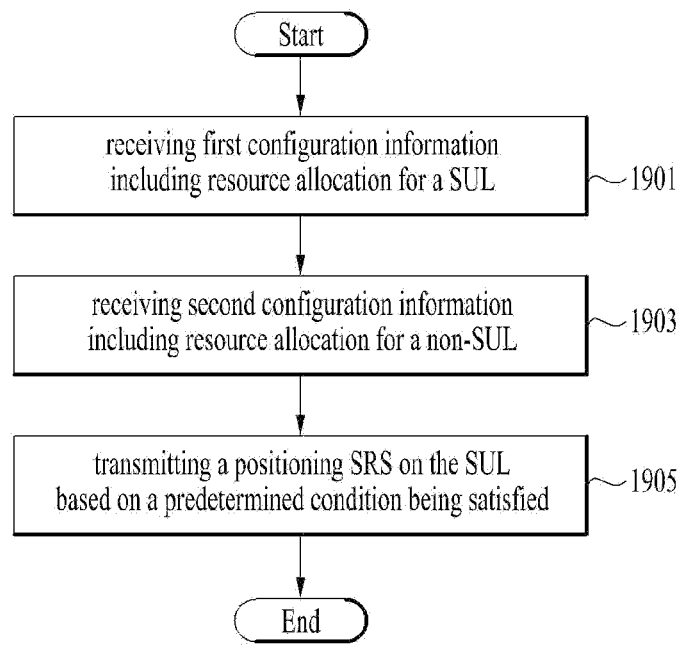
FIG. 19 is a diagram schematically illustrating a method of operating a UE according to various embodiments.

FIG. 19 is a diagram schematically illustrating a method of operating a UE according to various embodiments.

The UE may receive resource allocation information on SUL (1901).

The UE may receive resource allocation information on non-SUL (1903).

The UE may transmit a positioning SRS based on the resource allocation information, and the positioning SRS may be transmitted on the SUL or non-SUL (1905).

Figure 20:
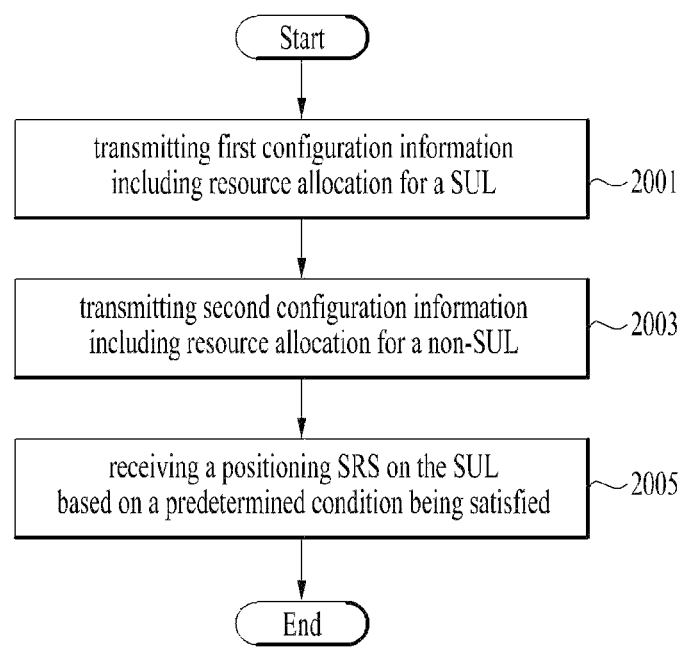
FIG. 20 is a diagram schematically illustrating a method of operating a network node according to various embodiments.

FIG. 20 is a diagram schematically illustrating a method of operating a network node according to various embodiments.

The network node may transmit resource allocation information on SUL (2001).

The network node may transmit resource allocation information on non-SUL (2003).

The network node may receive a positioning SRS based on the resource allocation information, and the positioning SRS may be received on the SUL or non-SUL (2005).

The operations of the UE and/or network node according to various embodiments may be explained and performed based on the details described in Sections 1 to 3.

It is obvious that each of the examples of the proposed methods may also be included as one embodiment, and thus each example may be regarded as a kind of proposed method.

Although the proposed methods may be implemented independently, some of the proposed methods may be combined (or merged) for implementation. In addition, it may be regulated that information on whether the proposed methods are applied (or information on rules related to the proposed methods) should be transmitted from the BS to the UE in a predefined signal (e.g., a physical layer signal, a higher layer signal, etc.).

4. Exemplary Configurations of Devices Implementing Various Embodiments

4.1. Exemplary Configurations of Devices to which Various Embodiments are Applied FIG. 21 is a diagram illustrating a device that implements various embodiments.

Figure 21:
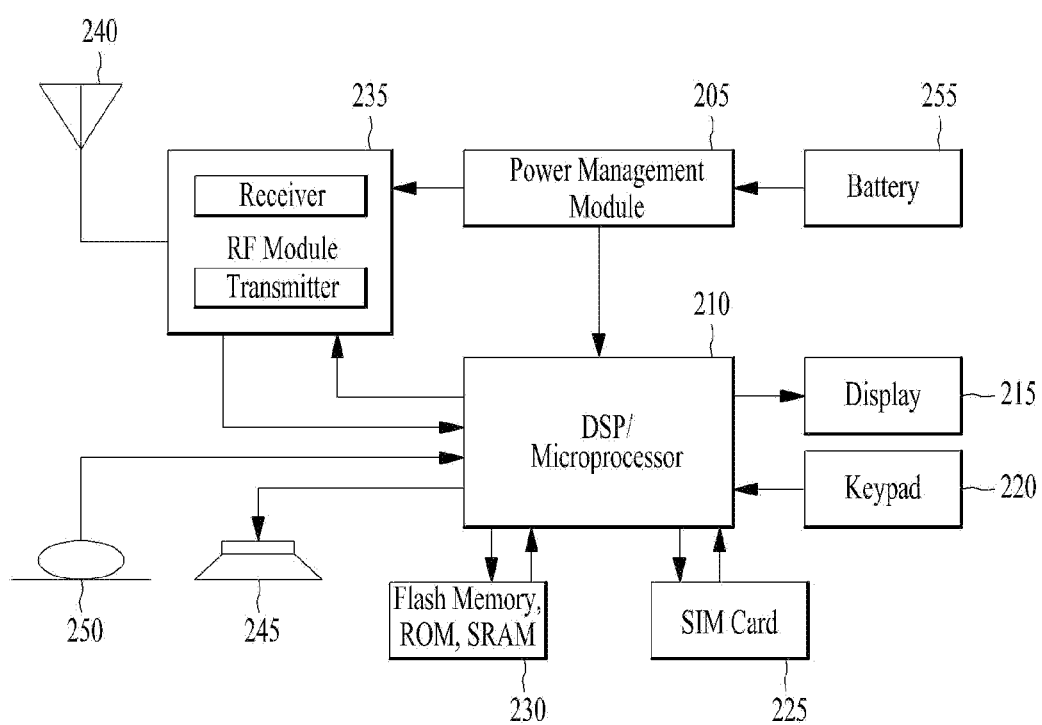
FIG. 21 is a block diagram illustrating an apparatus for implementing various embodiments.

The device illustrated in FIG. 21 may be a UE and/or a BS (e.g., eNB or gNB or TP) and/or a location server (or LMF) which is adapted to perform the above-described mechanism, or any device performing the same operation.

Referring to FIG. 21, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 21 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or at least one of the communication device included in the UE) may be configured to: receive first configuration information including resource allocation information on SUL; receive second configuration information including resource allocation information on non-SUL; and transmit a positioning SRS on the SUL based on that any one of predefined conditions is satisfied.

According to various embodiments, at least one processor included in the network node (or at least one processor of a communication device included in the network node) may be configured to: transmit first configuration information including resource allocation information on SUL; transmit second configuration information including resource allocation information on non-SUL; and receive a positioning SRS on the SUL based on that any one of predefined conditions is satisfied.

According to various embodiments, in the first priority, a priority of the normal SRS transmission may be higher than a priority of the positioning SRS transmission.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
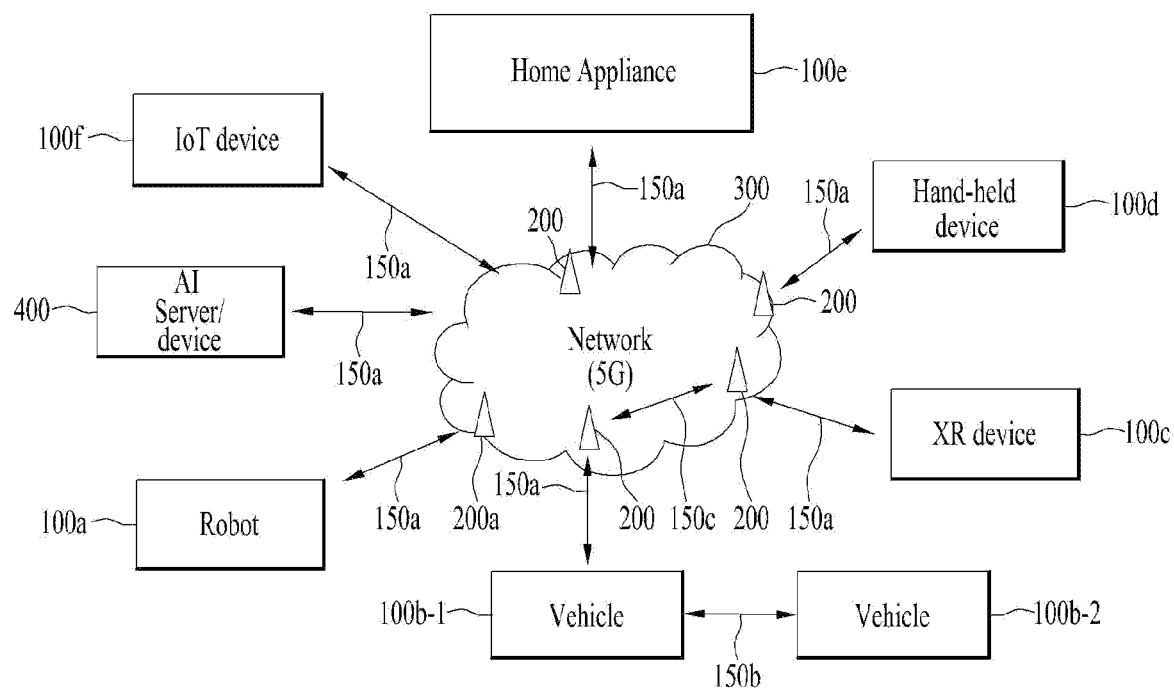
FIG. 22 illustrates an exemplary communication system to which various embodiments are applied.

FIG. 22 illustrates an exemplary communication system to which various embodiments are applied.

Referring to FIG. 22, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 23:
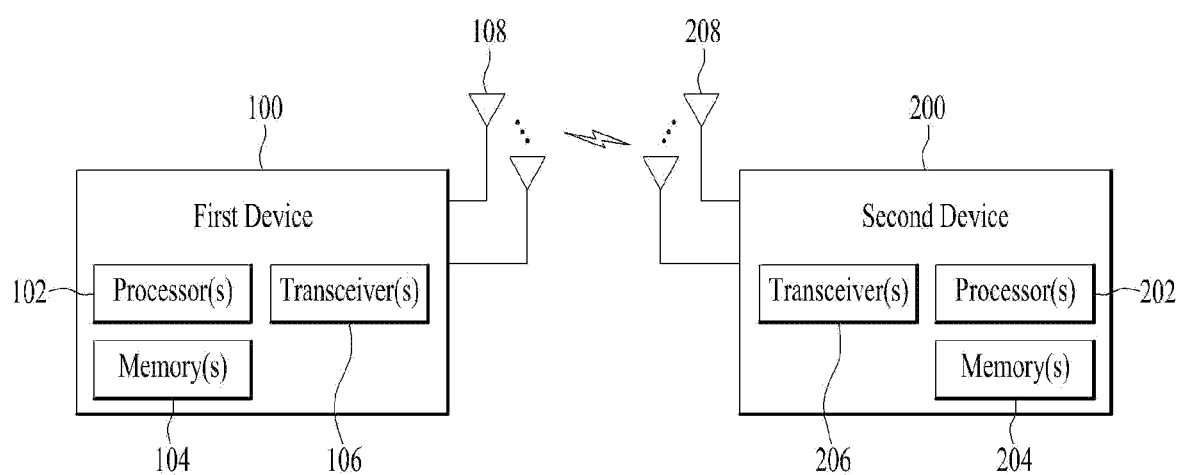
FIG. 23 illustrates exemplary wireless devices to which various embodiments are applicable.

FIG. 23 illustrates exemplary wireless devices to which various embodiments are applicable.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include at least one processor 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include at least one processor 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, at least one processor 102 and 202. For example, the at least one processor 102 and 202 may implement one or more layers (e.g., functional layers such as PHY, MAC, RLC, PDCP, RRC, and SDAP). The at least one processor 102 and 202 may generate one or more Protocol Data Units (PDUs) and/or one or more Service Data Unit (SDUs) according to the descriptions, functions, procedures, proposals, methods, and/or operational flowcharts disclosed in this document. The at least one processor 102 and 202 may generate messages, control information, data, or information according to the descriptions, functions, procedures, proposals, methods, and/or operational flowcharts disclosed in this document. The at least one processor 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The at least one processor 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The at least one processor 102 and 202 may be referred to as controllers, microcontrollers, microprocessors, or microcomputers. The at least one processor 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the at least one processor 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the at least one processor 102 and 202 or stored in the one or more memories 104 and 204 so as to be driven by the at least one processor 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the at least one processor 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the at least one processor 102 and 202. The one or more memories 104 and 204 may be connected to the at least one processor 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the at least one processor 102 and 202 and transmit and receive radio signals. For example, the at least one processor 102 and 202 may perform control so that the one or more transceivers 106 and 206 may transmit user data, control information, or radio signals to one or more other devices. The at least one processor 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the at least one processor 102 and 202. The one or more transceivers 106 and 206 may convert the user data, control information, radio signals/channels, etc. processed using the at least one processor 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause at least one processor operably coupled to the one or more memories to perform operations according to various embodiments or implementations of the present disclosure.

According to various embodiments, a computer-readable storage medium may store at least one instruction or computer programs which, when executed by at least one processor, cause the at least one processor to perform operations according to various embodiments or implementations of the present disclosure.

According to various embodiments, a processing device or apparatus may include at least one processor and one or more computer memories connected to the at least one processor. The one or more computer memories may store instructions or programs which, when executed, cause the at least one processor operably coupled to the one or more memories to perform operations according to various embodiments or implementations of the present disclosure.

Example of Using Wireless Devices to which Various Embodiments are Applied

Figure 24:
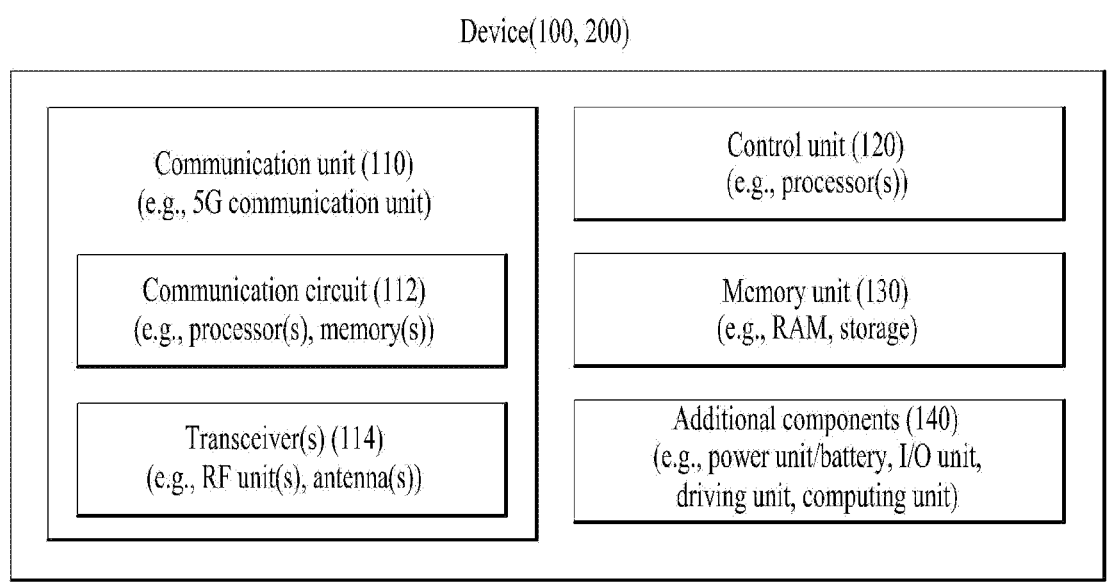
FIG. 24 illustrates other exemplary wireless devices to which various embodiments are applied.

FIG. 24 illustrates other exemplary wireless devices to which various embodiments are applied. The wireless devices may be implemented in various forms according to a use case/service (see FIG. 22).

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the at least one processor 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of at least one processor. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Example of Portable Device to which Various Embodiments are Applied

Figure 25:
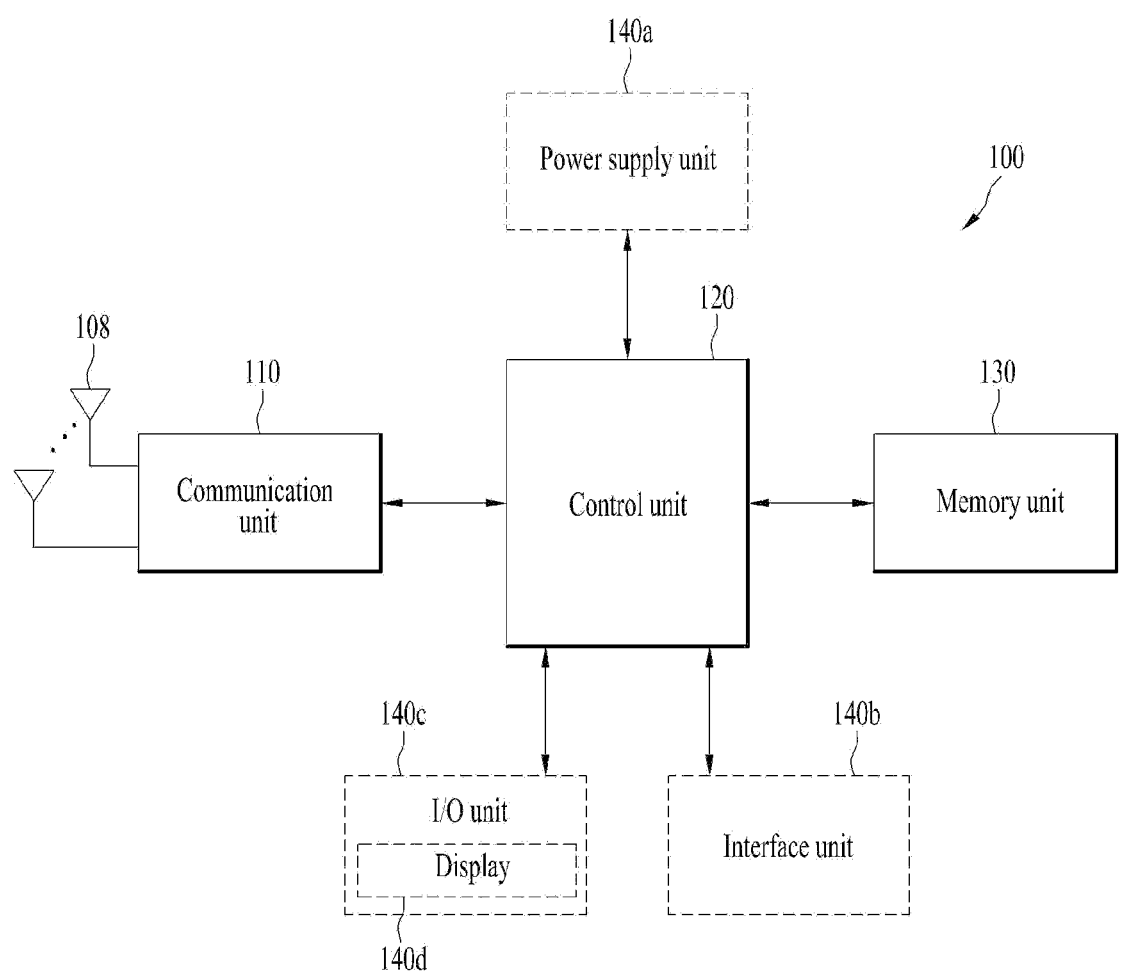
FIG. 25 illustrates an exemplary portable device to which various embodiments are applied.

FIG. 25 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments

Figure 26:
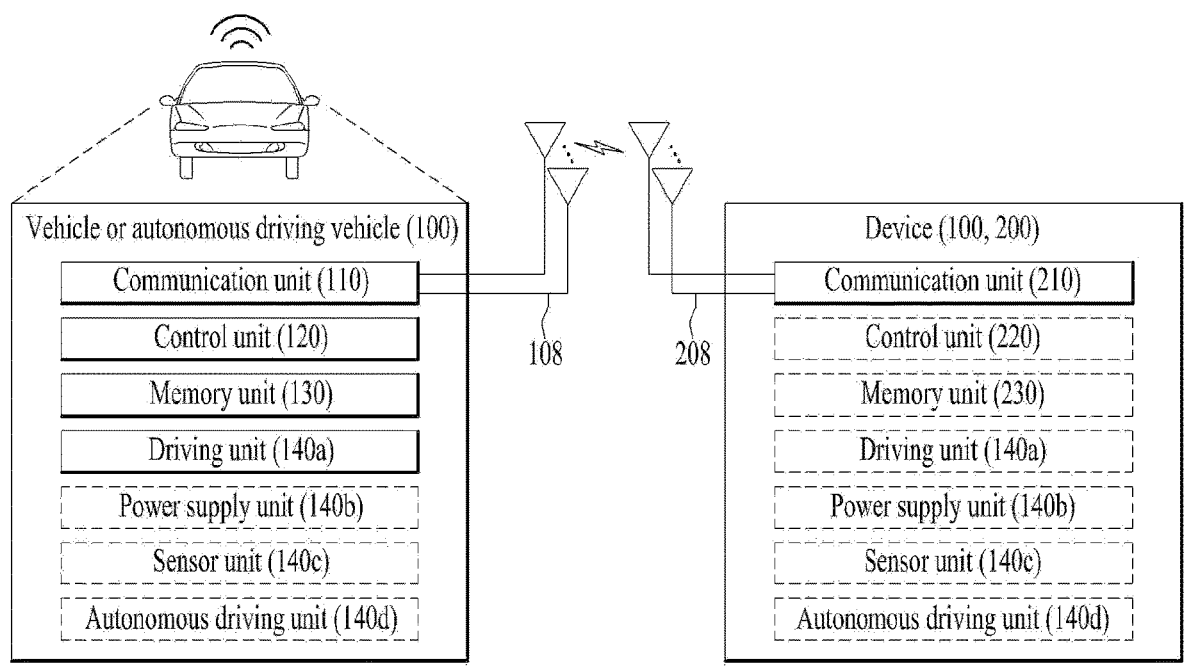
FIG. 26 illustrates an exemplary vehicle or autonomous driving vehicle to which various embodiments.

FIG. 26 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc.

performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE), the method comprising:
   receiving first configuration information comprising resource allocation information for a supplementary uplink (SUL);
   receiving second configuration information comprising resource allocation information for a non-SUL; and
   transmitting a positioning sounding reference signal (SRS) on the SUL based on that any one of predefined conditions is satisfied,
   wherein each of the first configuration information and the second configuration information comprises frequency hopping information for the positioning SRS.

2. The method of claim 1, wherein based on that none of the predefined conditions are satisfied, the positioning SRS is transmitted on the non-SUL.

3. The method of claim 1, wherein the predefined conditions comprise reception of information indicating that the positioning SRS is transmitted on the SUL.

4. The method of claim 1, further comprising:
   receiving a downlink reference signal (DL RS); and
   detecting strength of the RS,
   wherein the predefined conditions comprise that the strength of the DL RS is less than a predefined threshold,
   wherein the RS comprises at least one of a synchronization signal block (SSB), a channel state information reference signal (CSI-RS), or a positioning reference signal (PRS).

5. The method of claim 1, further comprising receiving information on a number of repeated transmissions and a transmission periodicity related to the positioning SRS.

6. The method of claim 1, further comprising receiving information for configuring a compensation value that compensates for power for SUL switching,
   wherein transmission power of the positioning SRS transmitted on the SUL is determined based on: (i) a path loss value based on a downlink reference signal (DL RS) measured on the non-SUL; and (ii) the compensation value.

7. A user equipment (UE) comprising:
   at least one transceiver;
   at least one processor connected to the at least one transceiver, and
   at least one memory operably connectable to the at least one processor and storing instructions that, when executed by the at least one processor, causes the UE to perform operations comprising:
   receiving first configuration information comprising resource allocation information for a supplementary uplink (SUL);
   receiving second configuration information comprising resource allocation information for a non-SUL; and
   transmitting a positioning sounding reference signal (SRS) on the SUL based on that any one of predefined conditions is satisfied,
   wherein each of the first configuration information and the second configuration information comprises frequency hopping information for the positioning SRS.

8. The UE of claim 7, wherein based on that none of the predefined conditions are satisfied, the positioning SRS is transmitted on the non-SUL.

9. The UE of claim 7, wherein the at least one processor is further configured to receive information for configuring a compensation value that compensates for power for SUL switching, and
   wherein transmission power of the positioning SRS transmitted on the SUL is determined based on: (i) a path loss value based on a downlink reference signal (DL RS) measured on the non- SUL; and (ii) the compensation value.

10. The UE of claim 7, wherein the at least one processor is configured to communicate with at least one of a mobile UE, a network, or an autonomous vehicle other than a vehicle including the UE.

11. A base station comprising:
    at least one transceiver;
    at least one processor connected to the at least one transceiver, and
    at least one memory operably connectable to the at least one processor and storing instructions that, when executed by the at least one processor, causes the base station to perform operations comprising:
    transmitting first configuration information comprising resource allocation information for a supplementary uplink (SUL);
    transmitting second configuration information comprising resource allocation information for a non-SUL; and
    receiving a positioning sounding reference signal (SRS) on the SUL based on that any one of predefined conditions is satisfied,
    wherein each of the first configuration information and the second configuration information comprises frequency hopping information for the positioning SRS.

* * * * *